United States Patent
Fujimoto

(10) Patent No.: US 11,508,406 B2
(45) Date of Patent: Nov. 22, 2022

(54) MAGNETIC RECORDING MEDIUM, MANUFACTURING METHOD OF PARTICLES OF EPSILON TYPE IRON OXIDE-BASED COMPOUND, AND MANUFACTURING METHOD OF MAGNETIC RECORDING MEDIUM

(71) Applicant: FUJIFILM CORPORATION, Tokyo (JP)

(72) Inventor: Takashi Fujimoto, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 540 days.

(21) Appl. No.: 16/260,027

(22) Filed: Jan. 28, 2019

(65) Prior Publication Data

US 2019/0304496 A1   Oct. 3, 2019

(30) Foreign Application Priority Data

Mar. 29, 2018   (JP) .............................. JP2018-064776

(51) Int. Cl.
| | | |
|---|---|---|
| G11B 5/712 | (2006.01) | |
| G11B 5/71 | (2006.01) | |
| G11B 5/706 | (2006.01) | |
| G11B 5/714 | (2006.01) | |
| C01G 49/00 | (2006.01) | |

(52) U.S. Cl.
CPC ...... *G11B 5/70642* (2013.01); *C01G 49/0045* (2013.01); *G11B 5/71* (2013.01); *G11B 5/712* (2013.01); *G11B 5/714* (2013.01); *C01P 2002/90* (2013.01); *C01P 2004/64* (2013.01); *C01P 2006/42* (2013.01)

(58) Field of Classification Search
CPC ....... G11B 5/70642; G11B 5/71; G11B 5/712; G11B 5/714
See application file for complete search history.

(56) References Cited

U.S. PATENT DOCUMENTS

| | | | | |
|---|---|---|---|---|
| 5,645,917 | A | * 7/1997 | Ejiri ......................... | G11B 5/70 428/141 |
| 2006/0014051 | A1 | 1/2006 | Iso et al. | |
| 2007/0218319 | A1 | 9/2007 | Ohkoshi et al. | |
| 2014/0314658 | A1 | 10/2014 | Hattori | |
| 2016/0064025 | A1* | 3/2016 | Kurokawa ............... | G11B 5/71 428/840.4 |
| 2017/0162220 | A1 | 6/2017 | Nakashio et al. | |
| 2017/0221513 | A1 | 8/2017 | Hiroi et al. | |
| 2017/0249963 | A1 | 8/2017 | Oyanagi et al. | |
| 2018/0033528 | A1 | 2/2018 | Sakane et al. | |
| 2018/0208479 | A1* | 7/2018 | Sakane ................. | G11B 5/714 |

FOREIGN PATENT DOCUMENTS

| | | |
|---|---|---|
| CN | 1327178 A | 12/2001 |
| CN | 1722236 A | 1/2006 |
| EP | 0520155 A2 | 12/1992 |
| JP | 2002-298332 A | 10/2002 |
| JP | 2006-286114 A | 10/2006 |
| JP | 2007-281410 A | 10/2007 |
| JP | 2014-216034 A | 11/2014 |
| JP | 2016-051493 A | 4/2016 |
| JP | 2017-24981 A | 2/2017 |
| JP | 2017-139044 A | 8/2017 |
| JP | 2017-157252 A | 9/2017 |
| WO | 2015/198514 A1 | 12/2015 |
| WO | 2016/148092 A1 | 9/2016 |

OTHER PUBLICATIONS

English language translation of the following: Office action dated Dec. 15, 2020 from the JPO in a Japanese patent application No. 2018-064776 corresponding to the instant patent application. This office action translation is submitted now in order to supplement the understanding of the cited references which are being disclosed in the instant Information Disclosure Statement.

English language translation of the following: Office action dated May 21, 2021 from the SIPO in a Chinese patent application No. 201910147242.6 corresponding to the instant patent application. This office action translation is submitted now in order to supplement the understanding of the cited references which are being disclosed in the instant Information Disclosure Statement.

English language translation of the following: Office action dated Jan. 7, 2022 from the SIPO in a Chinese patent application No. 201910147242.6 corresponding to the instant patent application.

\* cited by examiner

*Primary Examiner* — Holly Rickman
*Assistant Examiner* — Linda N Chau
(74) *Attorney, Agent, or Firm* — Solaris Intellectual Property Group, PLLC

(57) ABSTRACT

Provided are a magnetic recording medium including: a non-magnetic support; and a magnetic layer which is provided on at least one surface of the non-magnetic support and includes particles of epsilon type iron oxide-based compound, and a binding agent, in which a contact angle measured regarding a surface of the magnetic layer is equal to or greater than 30.0° and smaller than 45.0° with respect to 1-bromonaphthalene and 80.0° to 95.0° with respect to water, a manufacturing method of particles of an epsilon iron oxide-based compound, and a manufacturing method of a magnetic recording medium.

7 Claims, No Drawings

MAGNETIC RECORDING MEDIUM, MANUFACTURING METHOD OF PARTICLES OF EPSILON TYPE IRON OXIDE-BASED COMPOUND, AND MANUFACTURING METHOD OF MAGNETIC RECORDING MEDIUM

CROSS-REFERENCE TO RELATED APPLICATIONS

This application claims priority under 35 USC 119 from Japanese Patent Application No. 2018-064776 filed on Mar. 29, 2018, the disclosure of which is incorporated by reference herein in its entirety.

BACKGROUND OF THE INVENTION

1. Field of the Invention

The present disclosure relates to a magnetic recording medium, a manufacturing method of particles of an epsilon type iron oxide-based compound, and a manufacturing method of a magnetic recording medium.

2. Description of the Related Art

The recording and reproducing of a signal on a magnetic recording medium such as a magnetic tape are normally performed by causing a magnetic recording medium to run in a drive to bringing a surface of a magnetic layer and a magnetic head into contact with each other to slide thereon. In a case where the surface of the magnetic layer and the magnetic head repeatedly slide on each other, the amount of friction increases, and accordingly, a part of the magnetic layer is chipped off and the magnetic head is contaminated. From the circumstance, in order to prevent an increase in amount of friction of the surface of the magnetic layer and prevent contamination of the magnetic head, a technology of causing a magnetic layer and a non-magnetic layer to include a lubricant is proposed (for example, see JP2002-298332A). However, in a case of decreasing the amount of friction by simply using a lubricant, the amount of the lubricant present on the surface of the magnetic layer increases. The lubricant is attached to the magnetic head from the surface of the magnetic layer, and this causes contamination of the magnetic head due to the lubricant.

In order to prevent an increase the amount of friction of the surface of the magnetic layer, a magnetic recording medium in which a contact angle measured regarding a surface of the magnetic layer is 45.0° to 55.0° with respect to 1-bromonaphthalene and 90.0° to 100.0° with respect to water is proposed (for example, see JP2016-051493A). In JP2016-051493A, a nitrogen-containing polymer or the like including a hydrophobic chain is added to a magnetic layer, as a contact angle adjusting agent capable of adjusting a 1-bromonaphthalene contact angle, in addition to a lubricant, by using ferromagnetic hexagonal barium ferrite powder as a magnetic material.

SUMMARY OF THE INVENTION

In recent years, a crystal structure of epsilon iron oxide ($\varepsilon$-$Fe_2O_3$) exhibiting extremely high coercivity while being nanosized particles is attracting attention as a magnetic material used in a magnetic recording medium, along with realization of high performance of a magnetic recording medium.

However, the inventors have found that, in a case where a magnetic head repeatedly slides on a magnetic layer including the crystal structure of $\varepsilon$-$Fe_2O_3$, a signal to noise ratio (SNR) may decrease. There is no sufficient research regarding the prevention of a decrease in an SNR in a magnetic recording medium using the crystal structure of $\varepsilon$-$Fe_2O_3$ so far.

This disclosure is made in consideration of these circumstances.

An object of one embodiment of the invention is to provide a magnetic recording medium which includes particles of an epsilon type ($\varepsilon$ type) iron oxide-based compound as a magnetic material, and in which a decrease in a signal to noise ratio (SNR) after repeated sliding is prevented.

Another object of one embodiment of the invention is to provide a manufacturing method of particles of an epsilon type iron oxide-based compound, capable of preventing a decrease in an SNR after repeated sliding, in a case being applied to a magnetic recording medium.

Still another object of one embodiment of the invention is to provide a manufacturing method of a magnetic recording medium which includes particles of an epsilon iron oxide-based compound as a magnetic material, and in which a decrease in an SNR after repeated sliding is prevented.

Means for achieving the aforementioned objects include the following aspects.

<1> A magnetic recording medium comprising: a non-magnetic support; and a magnetic layer which is provided on at least one surface of the non-magnetic support and includes particles of at least one kind of epsilon ($\varepsilon$) type iron oxide-based compound selected from the group consisting of compounds represented by Formula (1), and a binding agent, in which a contact angle measured regarding a surface of the magnetic layer is equal to or greater than 30.0° and smaller than 45.0° with respect to 1-bromonaphthalene and 80.0° to 95.0° with respect to water.

$$\varepsilon\text{-}A_aFe_{2-a}O_3 \quad (1)$$

In Formula (1), A represents at least one kind of metal element other than Fe, and a represents a number that satisfies a relationship of $0 \leq a < 2$.

<2> The magnetic recording medium according to <1>, in which the magnetic layer includes at least one kind of lubricant selected from the group consisting of fatty acid, fatty acid ester, and fatty acid amide.

<3> The magnetic recording medium according to <1> or <2>, in which an average equivalent circle diameter of the particles of the epsilon iron oxide-based compound is 7 nm to 25 nm.

<4> The magnetic recording medium according to any one of <1> to <3>, in which the compound represented by Formula (1) is a compound represented by Formula (6).

$$\varepsilon\text{-}X_xY_yZ_zFe_{2-x-y-z}O_3 \quad (6)$$

In Formula (6), X represents at least one kind of divalent metal element selected from the group consisting of Co, Ni, Mn, and Zn, Y represents at least one kind of tetravalent metal element selected from Ti or Sn, and Z represents at least one kind of trivalent metal element selected from the group consisting of Ga, Al, In, and Rh. x represents a number that satisfies a relationship of $0 < x < 1$, y represents a number that satisfies a relationship of $0 < y < 1$, z represents a number that satisfies a relationship of $0 < z < 1$, and $x+y+z < 2$.

<5> The magnetic recording medium according to <4>, in which X is a metal element selected from Co or Mn, Y is Ti, and Z is a metal element selected from Ga or Al.

<6> A manufacturing method of particles of an epsilon iron oxide-based compound, the method comprising: adding an alkali agent to an aqueous solution including a compound including trivalent ferrous ions; adding a silane compound including a hydrolyzable group after adding the alkali agent, to obtain a precursor particle dispersion liquid; extracting precursor particles from the precursor particle dispersion liquid; performing heat treatment on the precursor particles in a temperature range of 800° C. to 1,400° C. to obtain heat-treated particles; and adding the heat-treated particles to an alkali aqueous solution and performing treatment at a liquid temperature equal to or higher than 75° C.

<7> The manufacturing method of particles of an epsilon iron oxide-based compound according to <6>, in which the alkali aqueous solution is an aqueous solution in which a concentration of a metal compound is 8 mol/L to 16 mol/L.

<8> A manufacturing method of a magnetic recording medium, the method comprising: preparing a magnetic layer forming composition using the particles of epsilon iron oxide-based compound obtained by the manufacturing method according to <6> or <7>; applying the magnetic layer forming composition onto a non-magnetic support to form a magnetic layer forming composition layer; performing an alignment in magnetic field with respect to the formed magnetic layer forming composition layer; and drying the magnetic layer forming composition layer subjected to the alignment in magnetic field to form a magnetic layer.

According to the one embodiment of the invention, a magnetic recording medium which includes particles of an epsilon (ε type) iron oxide-based compound as a magnetic material, and in which a decrease in an SNR after repeated sliding is prevented, is provided.

According to the other embodiment of the invention, a manufacturing method of particles of an epsilon iron oxide-based compound capable of preventing a decrease in an SNR after repeated sliding, in a case of being applied to a magnetic recording medium, is provided.

According to the other embodiment of the invention, a manufacturing method of a magnetic recording medium which includes particles of an epsilon iron oxide-based compound as a magnetic material, and in which a decrease in an SNR after repeated sliding is prevented, is provided.

DESCRIPTION OF THE PREFERRED EMBODIMENTS

Hereinafter, examples of embodiments of a magnetic recording medium, a manufacturing method of particles of an epsilon iron oxide-based compound, and a manufacturing method of a magnetic recording medium of this disclosure will be described. However, this disclosure is not limited to the following embodiments and modification can be suitably performed within a range of the objects of this disclosure.

In this disclosure, a numerical value range shown with "to" means a range including numerical values written before and after "to", respectively as the minimum value and the maximum value.

In the numerical value range disclosed in a stepwise manner in this disclosure, an upper limit value or a lower limit value disclosed in a certain numerical value range may be replaced with an upper limit value or a lower limit value of another numerical value range disclosed in a stepwise manner. In addition, in the numerical value range disclosed in this disclosure, an upper limit value or a lower limit value disclosed in a certain numerical value range may be replaced with values shown in examples.

In this disclosure, in a case where a plurality of substances corresponding to each component are present, the amount of each component means a content of the plurality of substances, unless otherwise noted.

In this disclosure, a term "step" not only means an independent step, but also includes a step, as long as the intended object of the step is achieved, even in a case where the step cannot be clearly distinguished from another step.

Magnetic Recording Medium

There is provided a magnetic recording medium of this disclosure, including: a non-magnetic support; and a magnetic layer which is provided on at least one surface of the non-magnetic support and includes particles of at least one kind of epsilon iron oxide-based compound selected from the group consisting of compounds represented by Formula (1) (hereinafter, may be collectively referred to as "epsilon iron oxide-based compound"), and a binding agent, in which a contact angle measured regarding a surface of the magnetic layer is equal to or greater than 30.0° and smaller than 45.0° with respect to 1-bromonaphthalene and 80.0° to 95.0° with respect to water.

$$\varepsilon\text{-}A_aFe_{2-a}O_3 \tag{1}$$

In Formula (1), A represents at least one kind of metal element other than Fe, and a represents a number that satisfies a relationship of $0 \leq a < 2$.

Hereinafter, the contact angle with respect to 1-bromonaphthalene measured regarding the surface of the magnetic layer is also referred to as a "1-bromonaphthalene contact angle". In addition, the contact angle with respect to water measured regarding the surface of the magnetic layer is also referred to as a "water contact angle".

In the related art, a magnetic recording medium using a ferromagnetic hexagonal barium ferrite powder in a magnetic layer has been known, and the research has been conducted regarding means for preventing friction in a case of using the magnetic layer brought into a contact with a magnetic head, to improve running properties and durability. As one of the methods, a method of including a lubricant in a magnetic layer and the like has been known as in JP2002-298332A, for example. In addition, JP2016-051493A discloses that a contact angle with respect to 1-bromonaphthalene and a contact angle with respect to water are respectively set to be in specific ranges by using a contact angle adjusting agent in addition to the lubricant, and accordingly, running durability is improved.

Meanwhile, in a magnetic recording medium, it is expected that an epsilon type iron oxide-based compound shows excellent magnetic properties as a magnetic material, and it is required that a decrease in an SNR is prevented, even in a case of using the epsilon type iron oxide-based compound as the magnetic material.

Here, the particles of the epsilon type iron oxide-based compound are different from the ferromagnetic hexagonal barium ferrite powder in a point of properties of the surface, and a crystal structure and size are different from each other. Accordingly, it is surmised that, in a case where the epsilon type iron oxide-based compound is included in the magnetic layer of the magnetic recording medium, a surface state of the magnetic layer to be formed is different.

From the technologies of the related art, JP2016-051493A discloses that the contact angle with respect to 1-bromonaphthalene and the contact angle with respect to water are respectively set to be in specific ranges, but an excellent effect of friction reduction cannot be expected in this range, in a case of using the epsilon type iron oxide-based compound.

As a result of intensive studies, the inventors have found that the amount of friction of particles of the epsilon type iron oxide-based compound to the magnetic head tends to be great, compared to that of the ferromagnetic hexagonal barium ferrite powder. Accordingly, in the magnetic recording medium including the magnetic layer formed of the particles of epsilon type iron oxide-based compound, a magnetic head is easily contaminated and a decrease in an SNR easily occurs.

JP2016-051493A discloses the maintaining of "high output" as an object, and the occurrence of a phenomenon of a decrease in a signal to noise ratio (SNR), in a case where the magnetic head repeatedly slides on the magnetic layer including the epsilon type iron oxide-based compound is not suggested. Accordingly, JP2016-051493A does not provide a suggestion regarding a method of preventing a decrease in an SNR.

As means for preventing friction of the magnetic layer including the particles of the epsilon type iron oxide-based compound and the magnetic head, various means of changing the kind of a lubricant, adjusting the content thereof, and flattening the magnetic layer were thought, but it was found that the simple flattening is not enough, and properties appearing on a film surface derived from the particles of the epsilon type iron oxide-based compound is changed.

With such circumstances, the inventors have found that, by selecting the particles of the epsilon type iron oxide-based compound as the magnetic particles, setting the contact angle measured regarding the surface of the magnetic layer with respect to 1-bromonaphthalene to be equal to or greater than 30.0° and smaller than 45.0°, and setting the contact angle with respect to water to be 80.0° to 95.0°, it is possible to improve a decrease in an SNR after the repeated sliding.

In addition, it is thought that, in the magnetic layer including particles of the epsilon type iron oxide-based compound, a dispersion component is dominant in a surface free energy based on the theory of Kitasaki-Hata (three-liquid method). It was found that, as an index of the dispersion component in the magnetic layer including the particles of the epsilon type iron oxide-based compound, the 1-bromonaphthalene contact angle is suitable. In addition, the lubricant present on the surface of the magnetic layer causes a contamination of the magnetic head and a decrease in an SNR. Therefore, the research has been conducted regarding the index of the presence amount of the lubricant on the surface of the magnetic layer including the particles of the epsilon type iron oxide-based compound, and it was found that the water contact angle is suitable.

1-Bromonaphthalene Contact Angle

First, the 1-bromonaphthalene contact angle which is one of the properties of the magnetic recording medium of this disclosure will be described.

In the magnetic recording medium of this disclosure, the 1-bromonaphthalene contact angle measured regarding the surface of the magnetic layer is equal to or greater than 30.0° and smaller than 45.0°. In a case where the 1-bromonaphthalene contact angle is equal to or greater than 30.0°, it is possible to prevent chipping of the surface of the magnetic layer due to the contact with a head surface of the magnetic head, and prevent a decrease in an SNR after the repeated sliding. In addition, in a case where the 1-bromonaphthalene contact angle is smaller than 45.0°, it is possible to decrease the amount of attached materials to the magnetic head caused by the chipping accompanied with a change of surface properties of the magnetic layer on an edge portion of the magnetic head, and prevent a decrease in an SNR after the repeated sliding.

From a viewpoint of more effectively preventing a decrease in an SNR of the magnetic recording medium after the repeated sliding, the 1-bromonaphthalene contact angle is preferably equal to or greater than 32.0° and more preferably equal to or greater than 35.0°. In addition, from a viewpoint of more effectively preventing a decrease in an SNR of the magnetic recording medium after the repeated sliding, the 1-bromonaphthalene contact angle is preferably equal to or smaller than 40.0°.

Among these, the 1-bromonaphthalene contact angle is preferably 32.0° to 43.0° and even more preferably 35.0° to 40.0°, from a viewpoint of further preventing a decrease in an SNR of the magnetic recording medium after the repeated sliding.

In this disclosure, the 1-bromonaphthalene contact angle is a value obtained by the following method using a contact angle measurement device.

A magnetic recording medium is cut out to have a predetermined size to obtain a sample for measurement. The sample for measurement is installed on slide glass, so that the magnetic layer of the sample for measurement becomes an outer surface. Then, 2.0 µl of 1-bromonaphthalene is added dropwise to the surface of the magnetic layer. The stable liquid droplet formed from the dropwise-added liquid is visually confirmed, a liquid droplet image is analyzed by contact angle analysis software attached to the contact angle measurement device, and the contact angle formed by the surface of the magnetic layer and the liquid droplet is measured. The calculation of the contact angle is performed by a θ/2 method, the measurement is performed six times per sample, and an average value thereof is set as the contact angle.

The measurement is performed in an environment of a temperature of 20° C. and relative humidity of 25%.

As the contact angle measurement device, a contact angle measurement device (product name: Drop Master 700) manufactured by Kyowa Interface Science Co., Ltd. can be used, for example. However, the contact angle measurement device is not limited thereto.

As the contact angle analysis software, image analysis software (product name: FAMAS) manufactured by Kyowa Interface Science Co., Ltd. can be used, for example. However, the contact angle analysis software is not limited thereto, and for example, commercially available analysis software or analysis software incorporating a well-known arithmetic expression may be used.

Specific examples of a method of obtaining the 1-bromonaphthalene contact angle are as shown in examples which will be described later.

The 1-bromonaphthalene contact angle can be, for example, controlled by the surface state of the particles of the epsilon iron oxide-based compound and the like. As an example of a method of manufacturing particles of the epsilon iron oxide-based compound, a method of including: a step of adding an alkali agent to an aqueous solution including a compound including trivalent ferrous ions; a step of adding a silane compound including a hydrolyzable group after adding the alkali agent, to obtain a precursor particle dispersion liquid; a step of extracting precursor particles from the precursor particle dispersion liquid; a step of performing heat treatment on the precursor particles in a temperature range of 800° C. to 1,400° C. to obtain heat-treated particles; and a step of adding the heat-treated particles to an alkali aqueous solution and performing treatment is used. In this case, as the liquid temperature of the alkali aqueous solution for the treatment of the heat-treated particles increases, the 1-bromonaphthalene contact angle tends to increase. In addition, as a concentration of the alkali aqueous solution for the treatment of the heat-treated particles increases, the 1-bromonaphthalene contact angle tends to increase. Furthermore, as a period of time of the treatment of the heat-treated particles performed with the alkali aqueous solution increases, the 1-bromonaphthalene contact angle tends to increase. More specific description will be described later.

Water Contact Angle

In the magnetic recording medium of this disclosure, the water contact angle measured regarding the surface of the magnetic layer is 80.0° to 95.0°. In the magnetic recording medium of this disclosure, by setting the water contact angle to be 80.0° to 95.0°, it is possible to prevent a decrease in an SNR after the repeated sliding.

By setting the water contact angle to be equal to or greater than 80.0°, it is possible to prevent chipping of the surface of the magnetic layer due to the contact with the head surface of the magnetic head, and it is possible to prevent a decrease in an SNR after the repeated sliding. In addition, by setting the water contact angle to be equal to or smaller than 95.0°, it is possible to decrease the amount of attached materials to the magnetic head caused by the chipping accompanied with a change of surface properties of the magnetic layer on an edge portion of the magnetic head, and prevent a decrease in an SNR after the repeated sliding.

The water contact angle is preferably equal to or greater than 85.0°, from a viewpoint of further preventing a decrease in an SNR of the magnetic recording medium after the repeated sliding. In addition, the water contact angle is preferably equal to or smaller than 93.0° and more preferably equal to or smaller than 90.0°, from a viewpoint of further preventing a decrease in an SNR of the magnetic recording medium after the repeated sliding.

The water contact angle is preferably 80.0° to 93.0°, more preferably 85.0° to 93.0°, and even more preferably 85.0° to 90.0°, from a viewpoint of further preventing a decrease in an SNR of the magnetic recording medium after the repeated sliding.

The water contact angle is a value obtained by the same method as the measuring method of the 1-bromonaphthalene contact angle, except that 1-bromonaphthalene used during the measurement of the 1-bromonaphthalene contact angle is changed to water.

The water contact angle can be, for example, controlled by use of a lubricant and the like. Specifically, as the presence amount of the lubricant on the surface of the magnetic layer increases, the water contact angle tends to increase. More specific description will be described later.

The water contact angle may be affected by a surface state of the particles of the epsilon iron oxide-based compound and the like. Accordingly, the water contact angle may be adjusted by adjusting at least one conditions of the liquid temperature and concentration of the alkali aqueous solution for treatment of the heat-treated particles, or the period of time of the treatment performed with the alkali aqueous solution, in a case of manufacturing the epsilon iron oxide-based compound.

Layer Configuration of Magnetic Recording Medium

The magnetic recording medium of this disclosure includes a non-magnetic support as a base material, and a magnetic layer as a magnetic recording layer, and may include other layers, if necessary.

As the other layers which can be included in the magnetic recording medium of this disclosure, a non-magnetic layer, a back coating layer, and the like are used.

Non-Magnetic Support

The magnetic recording medium of this disclosure includes a non-magnetic support.

In this disclosure, the "non-magnetic support" means a support satisfying at least one of a residual magnetic flux density equal to or smaller than 10 mT or coercivity equal to or smaller than 7.98 kA/m (100 Oe).

The non-magnetic support can be used without particular limitation, as long as it is a well-known non-magnetic support used in the magnetic recording medium.

A material of the non-magnetic support can be suitably selected among the materials not having magnetism, by considering physical properties such as formability or durability, in accordance with the kinds of the magnetic recording medium. As the material of the non-magnetic support, materials such as a resin material not including a magnetic material, an inorganic material not having magnetism, and the like can be used.

Examples of the resin material include a resin material such as polyester such as polyethylene terephthalate (PET) or polyethylene naphthalate (PEN), polyolefin such as polyethylene or polypropylene, a polyamide-based resin such as aromatic polyamide including polyamide, polyamideimide, or polyaramide, polyimide, cellulose triacetate (TAC), polycarbonate (PC), polysulfone, and polybenzoxazole.

Among these, as the resin material, at least one kind selected from the group consisting of polyester and a polyamide-based resin is preferable, and at least one kind selected from the group consisting of polyethylene terephthalate, polyethylene naphthalate, and polyamide is more preferable, from viewpoints of excellent strength and durability and ease of processing.

The non-magnetic support is selected according to the usage aspect of the magnetic recording medium.

For example, in a case where the magnetic recording medium is a magnetic tape, a flexible disk, or the like, a resin film (or resin sheet) having flexibility can be used as the non-magnetic support.

For example, in a case where the magnetic recording medium is a hard disk, the shape of the non-magnetic support is a disk shape, and a resin formed body, an inorganic material formed body, or a metal material formed body which is harder than a component used for a flexible disk can be used as the non-magnetic support.

In a case of using a resin film as the non-magnetic support, the resin film may be an un-stretched film or may be a uniaxially stretched film or a biaxially stretched film. For example, in a case of using a polyester film as the non-magnetic support, a biaxially stretched polyester film may be used from a viewpoint of improving dimensional stability.

The resin film used for the non-magnetic support may have a laminated structure of two or more layers. For example, as disclosed in JP1991-224127A (JP-H03-224127A), a non-magnetic support obtained by laminating a film including two different layers can also be used, in order to change surface roughness of a surface on which a magnetic layer is formed and a surface on which a magnetic layer is not formed.

For example, in order to improve adhesiveness with the magnetic layer to be provided on the surface of the non-magnetic support, surface treatment such as corona discharge, plasma treatment, easy bonding treatment, or heat treatment may be performed on the non-magnetic support in advance, if necessary. In addition, in order to prevent foreign materials from mixing into the magnetic layer, surface treatment such as dust protection treatment may be performed on the non-magnetic support.

These surface treatments can be performed by a well-known method.

Thickness of Non-Magnetic Support

A thickness of the non-magnetic support is not particularly limited and is suitably selected according to the use of the magnetic recording medium.

For example, in a case where the thickness of the non-magnetic support is preferably 2.0 μm to 80 μm and more preferably 3.0 μm to 50 μm.

In a case where the thickness of the non-magnetic support is equal to or greater than 2.0 μm, excellent film forming properties and higher strength can be obtained. In a case where the thickness of the non-magnetic support is equal to or smaller than 80 μm, the thickness of the entire magnetic tape does not become unnecessarily excessively thick.

In a case where the magnetic recording medium is a magnetic tape, the thickness of the non-magnetic support is preferably 2.0 μm to 20 μm and more preferably 3.0 μm to 10 μm.

The thicknesses of the non-magnetic support and each layer of the magnetic recording medium which will be described later can be acquired by exposing a cross section of the magnetic recording medium in a thickness direction by a well-known method such as ion beams or a microtome, observing the exposed cross section with a scanning electron microscope, and obtaining a thickness measured regarding one portion in a thickness direction in the observed cross section or obtaining an arithmetical mean of thicknesses measured in randomly extracted plural portions (for example, two portions).

Magnetic Layer

The magnetic recording medium of this disclosure includes a magnetic layer at least on one surface of the non-magnetic support described above. The magnetic recording medium of this disclosure may include the magnetic layer only on one surface of the non-magnetic support or may include the magnetic layer on both surfaces of the non-magnetic support.

The magnetic layer includes particles of an epsilon iron oxide-based compound and a binding agent. The magnetic layer may further include other components.

Hereinafter, each component of the magnetic layer will be described in detail.

Particles of Epsilon Iron Oxide-Based Compound

The magnetic layer includes particles of at least one kind of epsilon iron oxide-based compound selected from the group consisting of compounds represented by Formula (1).

$$\varepsilon\text{-}A_a Fe_{2-a} O_3 \tag{1}$$

In Formula (1), A represents at least one kind of metal element other than Fe, and a represents a number that satisfies a relationship of $0 \leq a < 2$.

The compound represented by Formula (1) includes $\varepsilon\text{-}Fe_2O_3$, and a compound in which a part of $Fe^{3+}$ ion site of $\varepsilon\text{-}Fe_2O_3$ is substituted with a metal element other than Fe.

By substituting a part of $Fe^{3+}$ ion site of $\varepsilon\text{-}Fe_2O_3$ with a metal element other than Fe, it is possible to adjust magnetic properties or further stabilize a crystal structure of epsilon type iron oxide, for example.

The kind and the number of metal elements are not particularly limited, as long as A in Formula (1) is at least one kind of metal element other than Fe.

For example, from viewpoints of more easily forming a crystal structure of epsilon type iron oxide and more easily stabilizing the formed crystal structure, A in Formula (1) is preferably at least one kind of metal element selected from the group consisting of Ga, Al, In, Rh, Co, Ni, Mn, Zn, Ti, and Sn.

a in Formula (1) preferably represents a number that satisfies a relationship of $0.01 < a < 1.8$ and more preferably represents a number that satisfies a relationship of $0.05 < a < 1.5$, for example, from viewpoints of forming properties and stability of the crystal structure of the epsilon type iron oxide.

Among the compound represented by Formula (1), a compound represented by any of Formula (2) to Formula (6) shown below is preferable aspect, and among these, the compound represented by Formula (6) is more preferable from a viewpoint of more effectively preventing a decrease in an SNR.

$$\varepsilon\text{-}Z_z Fe_{2-z} O_3 \tag{2}$$

In Formula (2), Z represents at least one kind of trivalent metal element selected from the group consisting of Ga, Al, and In. z represents a number that satisfies a relationship of $0 < z < 2$.

Z in Formula (2) is preferably a metal element selected from Ga or Al, from a viewpoint of stabilization of an ε phase.

From a viewpoint of magnetic properties, z preferably represents a number that satisfies a relationship of $0 < z < 0.8$ and more preferably represents a number that satisfies a relationship of $0.05 < z < 0.6$.

Specific examples of the compound represented by Formula (2) include $\varepsilon\text{-}Ga_{0.55}Fe_{1.45}O_3$ and $\varepsilon\text{-}Al_{0.45}Fe_{1.55}O_3$.

$$\varepsilon\text{-}X_x Y_y Fe_{2-x-y} O_3 \tag{3}$$

In Formula (3), X represents at least one kind of divalent metal element selected from the group consisting of Co, Ni, Mn, and Zn, and Y represents at least one kind of tetravalent metal element selected from Ti or Sn. x represents a number that satisfies a relationship of $0 < x < 1$ and y represents a number that satisfies a relationship of $0 < y < 1$.

In Formula (3), X is preferably a metal element selected from Co or Mn, and Y is preferably Ti, from a viewpoint of magnetic properties.

It is preferable that x represents a number that satisfies a relationship of $0 < x < 0.4$ and y represents a number that satisfies a relationship of $0 < y < 0.4$, and it is more preferable that x represents a number that satisfies a relationship of $0 < x < 0.2$ and y represents a number that satisfies a relationship of $0 < y < 0.2$, from a viewpoint of stabilization of an ε phase.

Specific examples of the compound represented by Formula (3) include $\varepsilon\text{-}Co_{0.05}Ti_{0.05}Fe_{1.9}O_3$ and $\varepsilon\text{-}Mn_{0.075}Ti_{0.075}Fe_{1.85}O_3$.

$$\varepsilon\text{-}X_x Z_z Fe_{2-x-z} O_3 \tag{4}$$

In Formula (4), X represents at least one kind of divalent metal element selected from the group consisting of Co, Ni, Mn, and Zn, and Z represents at least one kind of trivalent metal element selected from the group consisting of Ga, Al, and In. x represents a number that satisfies a relationship of $0 < x < 1$ and z represents a number that satisfies a relationship of $0 < z < 1$.

In Formula (4), X is preferably a metal element selected from Co or Mn, and Z is preferably a metal element selected from Ga or Al, from viewpoints of stabilization of an ε phase and magnetic properties.

It is preferable that x represents a number that satisfies a relationship of 0<x<0.4 and z represents a number that satisfies a relationship of 0<z<0.6, and it is more preferable that x represents a number that satisfies a relationship of 0<x<0.2 and z represents a number that satisfies a relationship of 0.05<z<0.6, from viewpoints of stabilization of an ε phase and magnetic properties.

Specific examples of the compound represented by Formula (4) include $\varepsilon\text{-Mn}_{0.02}\text{Ga}_{0.5}\text{Fe}_{1.48}\text{O}_3$ and $\varepsilon\text{-Co}_{0.02}\text{Ga}_{0.4}\text{Fe}_{1.58}\text{O}_3$.

$$\varepsilon\text{-Y}_y\text{Z}_z\text{Fe}_{2-y-z}\text{O}_3 \quad (5)$$

In Formula (5), Y represents at least one kind of tetravalent metal element selected from Ti or Sn, or Z represents at least one kind of trivalent metal element selected from the group consisting of Ga, Al, and In. y represents a number that satisfies a relationship of 0<y<1 and z represents a number that satisfies a relationship of 0<z<1.

In Formula (5), Y is preferably Ti, and Z is preferably a metal element selected from Ga or Al, from viewpoints of stabilization of an ε phase and magnetic properties.

It is preferable that y represents a number that satisfies a relationship of 0<y<0.4 and z represents a number that satisfies a relationship of 0<z<0.8, and it is more preferable that y represents a number that satisfies a relationship of 0<y<0.2 and z represents a number that satisfies a relationship of 0.05<z<0.6, from viewpoints of stabilization of an ε phase and magnetic properties.

Specific examples of the compound represented by Formula (5) include $\varepsilon\text{-Ti}_{0.02}\text{Ga}_{0.5}\text{Fe}_{1.48}\text{O}_3$ and $\varepsilon\text{-Ti}_{0.02}\text{Al}_{0.5}\text{Fe}_{1.48}\text{O}_3$.

$$\varepsilon\text{-X}_x\text{Y}_y\text{Z}_z\text{Fe}_{2-x-y-z}\text{O}_3 \quad (6)$$

In Formula (6), X represents at least one kind of divalent metal element selected from the group consisting of Co, Ni, Mn, and Zn, Y represents at least one kind of tetravalent metal element selected from Ti or Sn, and Z represents at least one kind of trivalent metal element selected from the group consisting of Ga, Al, In, and Rh. x represents a number that satisfies a relationship of 0<x<1, y represents a number that satisfies a relationship of 0<y<1, z represents a number that satisfies a relationship of 0<z<1, and x+y+z<2.

In Formula (6), X is preferably a metal element selected from Co or Mn, Y is preferably Ti, and Z is preferably a metal element selected from Ga or Al, from viewpoints of stabilization of an ε phase and magnetic properties.

In Formula (6), regarding x, y, and z, it is preferable that x represents a number that satisfies a relationship of 0<x<0.4, y represents a number that satisfies a relationship of 0<y<0.7, and z represents a number that satisfies a relationship of 0<z<0.4, and it is more preferable that x represents a number that satisfies a relationship of 0.01<x<0.2, y represents a number that satisfies a relationship of 0.05<y<0.4, and z represents a number that satisfies a relationship of 0.01<z<0.2, from a viewpoint of preferred magnetic properties for being applied to a magnetic recording medium.

Specific examples of the compound represented by Formula (6) include $\varepsilon\text{-Ga}_{0.24}\text{Co}_{0.05}\text{Ti}_{0.05}\text{Fe}_{1.66}\text{O}_3$, $\varepsilon\text{-Ga}_{0.27}\text{Co}_{0.05}\text{Ti}_{0.05}\text{Fe}_{1.63}\text{O}_3$, $\varepsilon\text{-Al}_{0.20}\text{Co}_{0.06}\text{Ti}_{0.06}\text{Fe}_{1.68}\text{O}_3$, $\varepsilon\text{-Al}_{0.24}\text{Co}_{0.05}\text{Ti}_{0.05}\text{Fe}_{1.66}\text{O}_3$, and $\varepsilon\text{-Ga}_{0.15}\text{Mn}_{0.05}\text{Ti}_{0.05}\text{Fe}_{1.75}\text{O}_3$.

The confirmation of iron oxide-based compound having an epsilon type crystal structure can be performed, for example, by an X-ray diffraction (XRD) method.

In addition, the composition of the epsilon type iron oxide-based compound is confirmed by a high-frequency inductively coupled plasma (ICP) emission spectral analysis method. Specifically, a vessel containing 12 mg of particles of a sample and 10 ml of a hydrochloric acid aqueous solution having a concentration of 4 mol/L is held on a hot plate at a set temperature of 80° C. for 3 hours, and a solution is obtained. Then, the obtained solution is filtered by using a membrane filter having a hole diameter of 0.1 μm. The element analysis of the filtrate obtained is performed by using a high-frequency inductively coupled plasma (ICP) emission spectral analysis device. A content of each metal atom with respect to 100 atom % of iron atoms is obtained based on the result obtained from the element analysis.

The shape of the particles of the epsilon type iron oxide-based compound is not particularly limited and a shape such as a sphere shape, a rod shape, or a needle shape is used, for example.

Among these, the shape of the particles of the epsilon type iron oxide-based compound is preferably a sphere shape. A specific surface area of the sphere shape can be further decreased, compared to cases of the other shapes, and accordingly, the sphere shape is preferable from viewpoints of dispersion and alignment.

An average equivalent circle diameter of the primary particles of the particles of the epsilon type iron oxide-based compound is not particularly limited, and is, for example, preferably 7 nm to 25 nm, more preferably 8 nm to 20 nm, and even more preferably 10 nm to 17 nm.

In a case where the average equivalent circle diameter of the primary particles of the particles of the epsilon type iron oxide-based compound is equal to or greater than 7 nm, handling properties are further improved. In addition, the crystal structure of the epsilon type iron oxide is further stabilized and the distribution of magnetic properties is further reduced.

In a case where the average equivalent circle diameter of the primary particles of the particles of the epsilon type iron oxide-based compound is equal to or smaller than 25 nm, a recording density is further improved. In addition, magnetic properties are easily adjusted to magnetic properties suitable for recording and reproducing, and thus, a magnetic recording medium having a more excellent SNR can be realized.

In this disclosure, the "average equivalent circle diameter of the particles of the epsilon type iron oxide-based compound" means a number average value of equivalent circle diameters of 500 primary particles of the epsilon type iron oxide-based compound.

Each equivalent circle diameter of each particle of the epsilon type iron oxide-based compound is obtained based on a transmission electron microscope (TEM) image. Specifically, a diameter of a circle having the same area as the area (that is, projected area) of the particle of the epsilon type iron oxide-based compound in the TEM image is set as an equivalent circle diameter. A specific example of a measurement method of the average equivalent circle diameter of the particles of the epsilon type iron oxide-based compound is as shown in examples which will be described later.

The average equivalent circle diameter of the particles of the epsilon type iron oxide-based compound included in the magnetic layer can be measured by extracting the particles of the epsilon type iron oxide-based compound from the magnetic layer by the following method, for example.

(1) The surface treatment is performed with respect to the surface of the magnetic layer with a plasma reactor manufactured by Yamato Scientific Co., Ltd. for 1 minute to 2 minutes, and an organic component (for example, a binding agent) on the surface of the magnetic layer is incinerated and removed.

(2) A filter paper dipped in an organic solvent such as cyclohexanone or acetone is bonded to an edge portion of a metal rod. The surface of the magnetic layer subjected to the treatment of (1) is rubbed on the edge portion of the metal rod to which the filter paper is bonded, and the component of the magnetic layer is peeled off and transferred to the filter paper from the magnetic recording medium.

(3) The component of the magnetic layer peeled in the section (2) is shaken off to fall into an organic solvent such as cyclohexanone or acetone (specifically, the filter paper is put into the solvent and the component is shaken off by an ultrasonic disperser), the organic solvent is dried, and the peeled component of the magnetic layer is extracted.

(4) The component of the magnetic layer extracted in the section (3) is put into a sufficiently washed glass test tube, approximately 20 ml of n-butylamine (the amount capable of decomposing the remaining binding agent without being incinerated) is added thereto, and the glass test tube is sealed.

(5) The sealed glass test tube is heated at 170° C. for 20 hours or longer, and the binding agent component and the curing agent component are decomposed.

(6) The precipitate after the decomposition obtained in the section (5) is sufficiently washed with pure water and dried, and particles of the epsilon type iron oxide-based compound are extracted.

The average equivalent circle diameter of the particles of the epsilon type iron oxide-based compound can be controlled according to a firing temperature in a case of preparing particles of the epsilon type iron oxide-based compound, the kind of metal element to be substituted, and the like. For example, the average equivalent circle diameter of the particles of the epsilon type iron oxide-based compound can be increased by increasing a firing temperature in a case of preparing the particles or can be decreased by decreasing the firing temperature.

The magnetic layer may include only one kind or two or more kinds of particles of the epsilon type iron oxide-based compound.

A content of the particles of the epsilon type iron oxide-based compound in the magnetic layer is not particularly limited, and is, for example, preferably 50% by mass to 90% by mass and more preferably 60% by mass to 90% by mass with respect to the amount of solid contents of the magnetic layer.

In a case where the content of the particles of the epsilon type iron oxide-based compound in the magnetic layer is equal to or greater than 50% by mass with respect to the amount of solid contents of the magnetic layer, recording density can be further improved.

In a case where the content of the particles of the epsilon type iron oxide-based compound in the magnetic layer is equal to or smaller than 90% by mass with respect to the amount of solid contents of the magnetic layer, a film of the magnetic layer can be further hardened, and thus, sliding properties with a magnetic head is more easily ensured.

The particles of the epsilon type iron oxide-based compound can be obtained by a manufacturing method which will be described later. In addition, for example, a description disclosed in paragraphs 0021 to 0041 of JP2017-024981A can be referred to, for example.

Other Magnetic Materials

The magnetic layer may include other magnetic materials, if necessary, as the magnetic material, in addition to the epsilon type iron oxide-based compound. By replacing a part of the magnetic material with other magnetic material from the epsilon type iron oxide-based compound, the magnetic properties can be adjusted and cost can be reduced.

As the other magnetic material, for example, at least one kind of iron oxide-based compound selected from $\alpha$-$Fe_2O_3$, $\beta$-$Fe_2O_3$, or $\gamma$-$Fe_2O_3$ (hereinafter, may be referred to as the other iron oxide-based compounds) is used.

A content of at least one kind of iron oxide-based compound selected from the group consisting of $\alpha$-$Fe_2O_3$, $\beta$-$Fe_2O_3$, and $\gamma$-$Fe_2O_3$ in the magnetic layer is preferably equal to or smaller than 20 parts by mass and more preferably equal to or smaller than 5 parts by mass with respect to 100 parts by mass of a total amount of the magnetic materials in the magnetic layer.

Binding Agent

The magnetic layer includes a binding agent.

In the magnetic layer, the binding agent functions as a binder. As the binding agent, various resins are used. The resin used for the binding agent is not particularly limited, as long as a layer satisfying the desired physical properties such as strength and durability can be formed.

The resin used for the binding agent may be a homopolymer or a copolymer. The resin may be a well-known electron beam-curable resin.

Examples of the resin used for the binding agent include polyurethane, a polyester-based resin, a polyamide-based resin, a vinyl chloride-based resin, styrene, acrylonitrile, an acrylic resin obtained by copolymerization of methyl methacrylate, a cellulose resin such as nitrocellulose, an epoxy resin, a phenoxy resin, and a polyvinylalkylal resin such as polyvinyl acetal or polyvinyl butyral.

Among these, as the resin used for the binding agent, at least one kind selected from the group consisting of polyurethane, an acrylic resin, a cellulose-based resin, and a vinyl chloride-based resin is preferable.

The resin used for the binding agent preferably includes a functional group (for example, polar group) adsorbed to the surface of the particles of the epsilon type iron oxide-based compound in a molecule, from a viewpoint of further improving dispersibility of the particles of the epsilon type iron oxide-based compound, for example.

Examples of the preferable functional group include —$SO_3M$, —$SO_4M$, —$PO(OM)_2$, —$OPO(OM)_2$, —COOM, =$NSO_3M$, —$NRSO_3M$, —$NR^1R^2$, and —$N^+R^1R^2R^3X^-$.

Here, M represents a hydrogen atom or an alkali metal atom such as Na or K. R represents an alkylene group, $R^1$, $R^2$, and $R^3$ each independently represent a hydrogen atom, an alkyl group, or a hydroxyalkyl group. X represents a halogen atom such as Cl or Br.

In a case where the resin used for the binding agent includes the functional group, the content of the functional group in the resin is preferably 0.01 meq/g to 2.0 meq/g, and more preferably 0.3 meq/g to 1.2 meq/g.

In a case where the content of the functional group in the resin is in the range described above, further excellent dispersibility of the particles of the epsilon type iron oxide-based compound in the magnetic layer is obtained and magnetic flux density can be further improved.

The resin used for the binding agent is more preferably polyurethane including a —$SO_3Na$ group. In a case where polyurethane includes the —$SO_3Na$ group, the content of —$SO_3Na$ group is preferably 0.01 meq/g to 1.0 meq/g with respect to that of polyurethane.

A molecular weight of the resin used as the binding agent can be, for example, 10,000 to 200,000 as a weight-average molecular weight.

The weight-average molecular weight in this disclosure is a value obtained by performing polystyrene conversion of a value measured by gel permeation chromatography (GPC). As the measurement conditions, the following conditions can be used.

Conditions

GPC device: HLC-8120 (manufactured by Tosoh Corporation)

Column: TSK gel Multipore HXL-M (manufactured by Tosoh Corporation, 7.8 mmID (inner diameter)×30.0 cm)

Eluent: Tetrahydrofuran (THF)

Sample concentration: 0.5% by mass

Sample injection amount: 10 µl

Flow rate: 0.6 ml/min

Measurement temperature: 40° C.

Detector: RI detector

The magnetic layer may include one kind or two or more kinds of binding agent.

A content of the binding agent in the magnetic layer is not particularly limited, and is, for example, preferably 1 part by mass to 30 parts by mass and more preferably 2 parts by mass to 20 parts by mass with respect to 100 parts by mass of the particles of the epsilon type iron oxide-based compound.

In a case where the content of the binding agent in the magnetic layer is in the range described above with respect to 100 parts by mass of the particles of the epsilon type iron oxide-based compound, further excellent dispersibility of the particles of the epsilon type iron oxide-based compound is obtained and magnetic flux density can be further improved.

Other Additive

The magnetic layer may include various additives (that is, other additives), if necessary, other than the particles of the epsilon type iron oxide-based compound and the binding agent, within a range not negatively affecting the effects of this disclosure.

Examples of the other additives include a lubricant, an abrasive, a non-magnetic filler, a dispersing agent, a dispersing assistant, an antibacterial agent, an antistatic agent, and an antioxidant.

One component of the other additives may exhibit two or more functions.

Lubricant

The magnetic layer preferably includes a lubricant.

The lubricant contributes to the improvement of running durability of the magnetic recording medium.

As the lubricant, a well-known hydrocarbon-based lubricant and a fluorine-based lubricant can be used.

Examples of the hydrocarbon-based lubricant include a carboxylic acid-based compound such as fatty acid (for example, oleic acid or stearic acid); an ester-based compound such as fatty acid ester (for example, butyl stearate); a sulfonic acid-based compound such as octadecylsulfonic acid; a phosphoric acid ester-based compound such as monoctadecyl phosphate; an alcohol-based compound such as stearyl alcohol or oleyl alcohol; a carboxylic acid amide-based compound such as fatty acid amide (for example, stearic acid amide); and an amine-based compound such as stearyl amine. As the hydrocarbon-based lubricant, a compound including a polar group such as a hydroxyl group, an ester group, or a carboxy group in a hydrocarbon chain of the alkyl group is preferable, from a viewpoint of an effect of decreasing a frictional force.

As the fluorine-based lubricant, a compound obtained by substituting a part of or the entire alkyl group of the hydrocarbon-based lubricant described above with a fluoroalkyl group or a perfluoropolyether group.

As the lubricant, a commercially available product can be used.

Among these, as the lubricant, at least one kind selected from the group consisting of fatty acid, fatty acid ester, and fatty acid amide is preferably used, from viewpoints of improvement of durability of the magnetic layer and preventing head wear.

In a case where the magnetic layer includes the lubricant, one kind or two or more kinds of the lubricant may be included.

In a case where the magnetic layer includes the lubricant, a content of the lubricant in the magnetic layer is not particularly limited, and is, for example, preferably 0.1 parts by mass to 20 parts by mass and more preferably 0.5 parts by mass to 15 parts by mass, with respect to 100 parts by mass of the particles of the epsilon type iron oxide-based compound.

As the amount of the lubricant included in the magnetic layer increases, the water contact angle tends to increase.

Abrasive

The magnetic layer can include an abrasive.

In the magnetic layer, the abrasive contributes to reduction of tape damage such as wear or scratches which may occur during running of a magnetic recording medium, and removal of attached materials (so-called debris) attached to a magnetic head during use of a magnetic recording medium.

Examples of the abrasive include α-alumina, β-alumina, silicon carbide, chromium oxide, cerium oxide, α-iron oxide, corundum, artificial diamond, silicon nitride, silicon carbide, titanium carbide, titanium oxide, silicon dioxide, and boron nitride, for example, mainly particles of a well-known material having Mohs hardness equal to or greater than 6.

As the abrasive, a complex of the abrasives described above (for example, abrasive subjected to surface treatment with another abrasive) may be used. A compound or an element other than the main component may be included in the abrasive, but there is no change in effect as the abrasive, as long as the content of the main component is equal to or greater than 90% by mass.

The shape of the abrasive is not particularly limited and examples thereof include a particle shape such as a needle shape, a sphere shape, a cube shape, and a rectangular shape.

Among these, the shape of the abrasive is preferably a shape having a shape including a corner in a part of the particle, such as a needle shape or a cube shape, from a viewpoint of obtaining further excellent abrasive properties, for example.

An average equivalent circle diameter of particles the abrasive is not particularly limited, and is, for example, preferably 0.01 µm to 2.0 µm, more preferably 0.05 µm to 1.0 µm, and even more preferably 0.05 µm to 0.5 µm, from a viewpoint of more suitably maintaining abrasive properties of the abrasive.

By combining plural kinds of the abrasives having different particle diameters, durability of the magnetic layer can be improved. In addition, by narrowing the particle size distribution of the particles of the abrasive, it is also possible to increase electromagnetic conversion characteristics of the magnetic recording medium.

In this disclosure, the average equivalent circle diameter of the particles the abrasive can be measured by the same method as that of the average equivalent circle diameter of the particles of the epsilon type iron oxide-based compound described above. In addition, the particles of the abrasive can be extracted from the magnetic layer by the same method as the method of extracting the particles of the epsilon type iron oxide-based compound from the magnetic layer.

A BET specific surface area of the abrasive is preferably 1 $m^2/g$ to 30 $m^2/g$.

A tap density of the abrasive is preferably 0.3 g/ml to 2 g/ml.

As the abrasive, a commercially available product can be used.

Examples of the commercially available product include AKP-12, AKP-15, AKP-20, AKP-30, AKP-50, HIT20, HIT-30, HIT-55, HIT60A, HIT70, HIT80, and HIT100 manufactured by Sumitomo Chemical Co., Ltd., ERC-DBM, HP-DBM, and HPS-DBM manufactured by Reynolds Co., Ltd., WA10000 manufactured by Fujimi Incorporated, UB20 manufactured by Uyemura & Co., Ltd., G-5, Kromex U2, and Kromex U1 manufactured by Nippon Chemical Industrial Co., Ltd., TF100 and TF140 manufactured by Toda Kogyo Corp., Beta Random Ultrafine manufactured by IBIDEN CO., LTD., and B-3 manufactured by Showa KDE Co., Ltd. (all of the above examples are product names).

In a case where the magnetic layer includes an abrasive, one kind or two or more kinds of the abrasive may be included.

In a case where the magnetic layer includes the abrasive, a content of the abrasive in the magnetic layer is not particularly limited, and is, for example, preferably 0.1 parts by mass to 20 parts by mass and more preferably 0.5 parts by mass to 15 parts by mass, with respect to 100 parts by mass of the particles of the epsilon type iron oxide-based compound, from a viewpoint of satisfying both of an even more excellent SNR and excellent scratch resistance of the magnetic layer.

Non-Magnetic Filler

The magnetic layer can include a non-magnetic filler.

The non-magnetic filler contributes to adjustment of physical properties of film hardness or surface roughness of the magnetic layer.

In this disclosure, the "non-magnetic filler" means a filler satisfying at least one of a residual magnetic flux density equal to or smaller than 10 mT or coercivity equal to or smaller than 7.98 kA/m (100 Oe).

As the non-magnetic filler, carbon black or inorganic particles are used.

For example, as the non-magnetic filler, colloid particles are preferable, from viewpoints of dispersion stability and uniform disposition in the magnetic layer. In addition, at least one kind selected from the group consisting of carbon black and inorganic colloid particles is preferable, and at least one kind selected from the group consisting of carbon black and inorganic oxide colloid particles is more preferable, as the non-magnetic filler, from a viewpoint of availability, for example.

Examples of the inorganic oxide colloid particles include colloid particles of complex inorganic oxide such as $SiO_2/Al_2O_3$, $SiO_2/B_2O_3$, $TiO_2/CeO_2$, $SnO_2/Sb_2O_3$, $SiO_2/Al_2O_3/TiO_2$, or $TiO_2/CeO_2/SiO_2$, in addition to colloid particles of inorganic oxide such as α-alumina having an α transformation rate equal to or greater than 90%, β-alumina, γ-alumina, θ-alumina, silicon dioxide, silicon carbide, chromium oxide, cerium oxide, α-iron oxide, goethite, corundum, silicon nitride, titanium carbide, titanium dioxide, tin oxide, magnesium oxide, tungsten oxide, zirconium oxide, boron nitride, zinc oxide, calcium carbonate, calcium sulfate, barium sulfate, and molybdenum disulfide.

As the inorganic oxide colloid particles, silica colloid particles (colloidal silica) are particularly preferable, from a viewpoint of availability of monodisperse colloid particles.

An average particle diameter of the non-magnetic filler is not particularly limited, and is, for example, preferably 30 nm to 300 nm, more preferably 40 nm to 250 nm, and even more preferably 50 nm to 200 nm, from viewpoints of reducing recording errors and ensuring spacing of a magnetic head.

In this disclosure, the average particle diameter of the non-magnetic filler is a value measured by a transmission electron microscope (TEM). The non-magnetic filler can be extracted from the magnetic layer by the same method as the method of extracting the particles of the epsilon type iron oxide-based compound from the magnetic layer.

In a case where the magnetic layer includes the non-magnetic filler, one kind or two or more kinds of the non-magnetic filler may be included.

As the non-magnetic filler, a commercially available product can be used.

In a case where the magnetic layer includes the non-magnetic filler, a content of the non-magnetic filler in the magnetic layer is not particularly limited, and is, for example, preferably 0.01 parts by mass to 10 parts by mass with respect to 100 parts by mass of the particles of the epsilon type iron oxide-based compound.

Dispersing Agent

The magnetic layer can include a dispersing agent.

In the magnetic layer, the dispersing agent contributes to improvement of dispersibility of the particles of the epsilon type iron oxide-based compound and prevention of aggregation of the particles. In addition, the dispersing agent also contributes to the improvement of dispersibility of the abrasive.

As the dispersing agent, an organic compound including a functional group which is adsorbed to the surface of the particles of the epsilon type iron oxide-based compound is preferable.

As the organic compound including a functional group which is adsorbed to the surface of the particles of the epsilon type iron oxide-based compound, a compound including one to three groups of an amino group, a carboxy group, a sulfonic acid group, or a sulfinic acid group is used, and a polymer thereof may be used.

Examples of the preferable dispersing agent include compounds represented by structural formulae of R—$NH_2$, $NH_2$—R—$NH_2$, $NH_2$—R($NH_2$)—$NH_2$, R—COOH, COOH—R—COOH, COOH—R(COOH)—COOH, R—$SO_3H$, $SO_3H$—R—$SO_3H$, $SO_3H$—R($SO_3H$)—$SO_3H$, R—$SO_2H$, $SO_2H$—R—$SO_2H$, and $SO_2H$—R($SO_2H$)—$SO_2H$.

R in the structural formulae is linear, branched, or cyclic saturated or unsaturated hydrocarbon, and is preferably an alkyl group having 1 to 20 carbon atoms, for example.

Specific examples of the preferable dispersing agent include 2,3-dihydroxynaphthalene. Among these, the dispersing agent is more preferably 2,3-dihydroxynaphthalene, from a viewpoint of dispersibility. As the dispersing agent, a commercially available product can be used.

In a case where the magnetic layer includes the dispersing agent, one kind or two or more kinds of the dispersing agent may be used.

In a case where the magnetic layer includes the dispersing agent, a content of the dispersing agent in the magnetic layer is preferably 0.1 parts by mass to 30 parts by mass with respect to 100 parts by mass of the particles of the epsilon type iron oxide-based compound (in a case of including the abrasive, a total content of the particles of the epsilon type iron oxide-based compound and the abrasive).

In a case where the content of the dispersing agent in the magnetic layer is in the range described above with respect to 100 parts by mass of the particles of the epsilon type iron oxide-based compound (in a case of including the abrasive, a total content of the particles of the epsilon type iron oxide-based compound and the abrasive), further excellent dispersibility of the particles of the epsilon type iron oxide-based compound (in a case of including the abrasive, the particles of the epsilon type iron oxide-based compound and the abrasive) is obtained and scratch resistance is further improved.

Thickness of Magnetic Layer

The thickness of the magnetic layer is not particularly limited, and is suitably selected according to a saturation magnetization amount of a magnetic head used, a head gap length, a recording signal band, and the like.

A thickness of the magnetic layer is preferably 10 nm to 150 nm, more preferably 20 nm to 120 nm, and even more preferably 30 nm to 100 nm.

In a case where the thickness of the magnetic layer is equal to or greater than 10 nm, recording density can be further improved.

In a case where the thickness of the magnetic layer is equal to or smaller than 150 nm, noise is further reduced and more excellent electromagnetic conversion characteristics are obtained.

The magnetic recording medium of this disclosure may include at least one layer of the magnetic layer or, for example, may include two layers of the magnetic layer having different magnetic properties, and a configuration regarding a well-known multilayered magnetic layer can be applied. In a case where the magnetic layer is a multilayered magnetic layer, the thickness of the magnetic layer is a total thickness of the plurality of magnetic layers.

Hereinafter, the non-magnetic layer and the back coating layer which are predetermined layers of the magnetic recording medium will be described.

Non-Magnetic Layer

The non-magnetic layer is a layer contributing to thinning of the magnetic layer.

The non-magnetic layer is preferably a layer including non-magnetic particles as a filler and a binding agent which is a film forming component, and may further include additives, if necessary.

The non-magnetic layer can be provided between the non-magnetic support and the magnetic layer.

The non-magnetic layer includes a layer not having magnetism, and a substantially non-magnetic layer including a small amount of a ferromagnetic material (for example, particles of the epsilon type iron oxide-based compound) as impurities or intentionally. In this disclosure, the "non-magnetic layer" means a layer satisfying at least one of a residual magnetic flux density equal to or smaller than 10 mT or coercivity equal to or smaller than 7.98 kA/m (100 Oe).

Non-Magnetic Particles

The non-magnetic layer preferably includes non-magnetic particles.

In the non-magnetic layer, the non-magnetic particles can function as a filler.

In this disclosure, the "non-magnetic particles" mean particles satisfying at least one of a residual magnetic flux density equal to or smaller than 10 mT or coercivity equal to or smaller than 7.98 kA/m (100 Oe).

The non-magnetic particles may be inorganic particles or organic particles. As the non-magnetic particles, carbon black can also be used.

Examples of the inorganic particles include particles of metal, metal oxide, metal carbonate, metal sulfate, metal nitride, metal carbide, and metal sulfide.

Specific examples of the non-magnetic particles include titanium oxide such as titanium dioxide, cerium oxide, tin oxide, tungsten oxide, ZnO, $ZrO_2$, $SiO_2$, $Cr_2O_3$, α-alumina having an α transformation rate equal to or greater than 90%, β-alumina, γ-alumina, α-iron oxide, goethite, corundum, silicon nitride, titanium carbide, magnesium oxide, boron nitride, molybdenum disulfide, copper oxide, $MgCO_3$, $CaCO_3$, $BaCO_3$, $SrCO_3$, $BaSO_4$, silicon carbide, and titanium carbide.

Among these, as the non-magnetic particles, α-iron oxide is preferable.

The shape of the non-magnetic particles is not particularly limited and may be any of a needle shape, a sphere shape, a polyhedron shape, and a plate shape.

An average particle diameter of the non-magnetic particles is preferably 5 nm to 500 nm and more preferably 10 nm to 200 nm.

In a case where the average particle diameter of the non-magnetic particles is in the range described above, further excellent dispersibility is obtained and the surface roughness can be adjusted to more suitable surface roughness for the non-magnetic layer.

The dispersibility of the non-magnetic particles and the surface roughness of the non-magnetic layer can be suitably adjusted by combining non-magnetic particles having different average particle diameters or adjusting particle size distribution of the non-magnetic particles.

The average particle diameter of the non-magnetic particles is a value measured with a transmission electron microscope (TEM).

A BET specific surface area of the non-magnetic particles is preferably 50 $m^2$/g to 150 $m^2$/g.

In a case where the non-magnetic layer includes non-magnetic particles, one kind or two or more kinds of the non-magnetic particles may be included.

The non-magnetic particles can be purchased as a commercially available product and can also be manufactured by a well-known method.

In a case where the non-magnetic layer includes the non-magnetic particles, a content of the non-magnetic particles in the non-magnetic layer is preferably 50% by mass to 90% by mass and more preferably 60% by mass to 90% by mass with respect to the amount of solid contents of the non-magnetic layer.

Binding Agent

The non-magnetic layer preferably includes a binding agent.

The binding agent in the non-magnetic layer is the same as the binding agent described in the section of the magnetic layer, and the preferable aspects are also the same as the preferable aspects thereof. Therefore, the description is omitted here.

Other Additives

The non-magnetic layer may include various additives (that is, other additives), if necessary, in addition to the non-magnetic particles and the binding agent described above.

The other additives in the non-magnetic layer are the same as the other additives described in the section of the magnetic layer, and the preferable aspects are also the same as the preferable aspects thereof. Therefore, the description is omitted here.

Thickness of Non-Magnetic Layer

A thickness of the non-magnetic layer is not particularly limited.

The thickness of the non-magnetic layer is preferably 0.05 µm to 3.0 µm, more preferably 0.05 µm to 2.0 µm, and even more preferably 0.05 µm to 1.5 µm.

Back Coating Layer

A back coating layer is a layer contributing to running stability, in a case where a magnetic recording medium is obtained.

The back coating layer is preferably a layer including non-magnetic particles as a filler, and a binding agent which is a film forming component, and may further include additives, according to the purpose.

The back coating layer can be provided on a surface of the non-magnetic support on a side opposite to the magnetic layer side.

Binding Agent

The back coating layer preferably includes a binding agent.

The binding agent in the back coating layer is the same as the binding agent described in the section of the magnetic layer, and the preferable aspects are also the same as the preferable aspects thereof. Therefore, the description is omitted here.

Other Additives

The back coating layer may include various additives (that is, other additives), if necessary, in addition to the non-magnetic particles and the binding agent described above.

The other additives in the back coating layer are the same as the other additives described in the section of the magnetic layer, and the preferable aspects are also the same as the preferable aspects thereof. Therefore, the description is omitted here.

Thickness of Back Coating Layer

A thickness of the back coating layer is not particularly limited.

The thickness of the back coating layer is preferably equal to or smaller than 0.9 µm and more preferably 0.1 µm to 0.7 µm.

Manufacturing Method of Particles of Epsilon Type Iron Oxide-Based Compound

The manufacturing method of the particles of the epsilon type iron oxide-based compound of this disclosure includes a step of adding an alkali agent to an aqueous solution including a compound including trivalent ferrous ions (hereinafter, also referred to as a "step (I)"); a step of adding a silane compound including a hydrolyzable group after adding the alkali agent, to obtain a precursor particle dispersion liquid (hereinafter, also referred to as a "step (II)"); a step of extracting precursor particles from the precursor particle dispersion liquid (hereinafter, also referred to as a "step (III)"); a step of performing heat treatment on the precursor particles in a temperature range of 800° C. to 1,400° C. to obtain heat-treated particles (hereinafter, also referred to as a "step (IV)"); and a step of adding the heat-treated particles to an alkali aqueous solution and performing treatment at a liquid temperature equal to or higher than 75° C. (hereinafter, also referred to as a "step (V)").

The manufacturing method of the particles of the epsilon type iron oxide-based compound of this disclosure may further include other steps, according to the object.

As another preferable step, the following steps (I-1) and (I-2) which can be included between the step (I) and the step (II) is used.

Step (I-1): Step of adding a polyvalent carboxylic acid aqueous solution after adding the alkali agent of the step (I), and extracting generated solid components Step (II-1): Step of re-dispersing the extracted solid components in water In addition, as another step, a step (V-1) which can be included after the step (V) is used, for example.

Step (V-1): Step of washing and drying the obtained particles of the epsilon type iron oxide-based compound Step (I)

In the step (I), an alkali agent is added to an aqueous solution including a compound including trivalent ferrous ions.

The compound including trivalent ferrous ions is not particularly limited, and is, for example, preferably a water-soluble inorganic acid salt such as nitrate, sulfate, or chloride, from viewpoint of availability and cost. Specifically, iron (III) nitrate nonahydrate and iron (III) chloride hexahydrate are used.

Metal elements other than iron included in the magnetic particles can be included in the aqueous solution of the compound including trivalent ferrous ions.

The metal elements other than iron are, for example, metal elements represented by A in Formula (1). Specifically, Ga, Al, In, Rh, Co, Ni, Mn, Zn, Ti, and Sn are used. By adding the metal elements other than iron and changing the contents thereof, the phase of the obtained iron oxide-based compound can be changed.

A supply source of the metal element other than iron is not particularly limited, and a water-soluble inorganic acid salt such as nitrate, sulfate, or chloride is preferable, from viewpoint of availability and cost, for example. Specific examples thereof include gallium (III) nitrate octahydrate, cobalt (II) nitrate hexahydrate, titanium (IV) sulfate, aluminum (III) nitrate nonahydrate, indium (III) nitrate trihydrate, rhodium (III) nitrate, cobalt (II) chloride hexahydrate, manganese (II) nitrate hexahydrate, manganese (II) chloride tetrahydrate, nickel (II) nitrate hexahydrate, nickel (II) chloride hexahydrate, zinc (II) nitrate hexahydrate, zinc (II) chloride, and tin (IV) chloride pentahydrate.

Water used as a dispersion medium is preferably pure water and ion exchange water.

The aqueous solution including the compound including trivalent ferrous ions may further include at least one kind of compound selected from polyvinylpyrrolidone (PVP) or hexadecyltrimethylammonium bromide. By further including these compounds, particle diameters of particles of a precursor obtained in the subsequent step (II) tends to be further homogenized.

First, the compound including trivalent ferrous ions, and at least one kind of compound selected from the compound including a metal element other than iron included, if necessary, polyvinylpyrrolidone (PVP), or hexadecyltrimethylammonium bromide are added to water and stirred to prepare an aqueous solution. In the stirring, a well-known method can be used, and for example, stirring using a magnetic stirrer can be performed.

Next, the alkali agent is added while continuing the stirring of the aqueous solution including the compound including trivalent ferrous ions. By adding the alkali agent, hydroxide sol is generated.

Examples of the alkali agent include an ammonia aqueous solution, an aqueous solution of an ammonium salt compound, a sodium hydroxide (NaOH) aqueous solution, and a potassium hydroxide (KOH) aqueous solution.

A concentration of the ammonia aqueous solution and the aqueous solution of an ammonium salt compound can be, for example, 20% by mass to 30% by mass. A concentration of the sodium hydroxide (NaOH) aqueous solution and the potassium hydroxide (KOH) aqueous solution can be, for example, 0.1% by mass to 1.0% by mass.

The atmosphere during the addition of the alkali agent is not particularly limited, and may be performed under the atmosphere, that is, with the air under the ordinary pressure.

In a case of adding the alkali agent, a liquid temperature of the aqueous solution including the compound including trivalent ferrous ions is preferably 5° C. to 80° C.

Steps (I-1) and (I-2)

In Step (I-1), polyvalent carboxylic acid is added after adding the alkali agent in the step (I).

In a case where polyvalent carboxylic acid is added, solid components are generated. The generated solid components are extracted by solid-liquid separation. In the step (I-2), the extracted solid components are re-dispersed in water. By performing this step, a content of an amorphous component in a precursor obtained in the subsequent steps (II) to (IV) tends to decrease. In addition, in a case of performing the heat treatment in the further subsequent step (V), the generation of undesired fine particles caused by the presence of the amorphous component is prevented.

From a viewpoint of further decreasing the content of the amorphous component in the precursor, it is preferable that the solid components extracted in the step (I-1) are washed with pure water and dried, and then re-dispersed in water.

Examples of polyvalent carboxylic acid include citric acid, tartaric acid, and malic acid, and citric acid is preferable, from a viewpoint of causing particle diameters of the particles of the solid component to be further even.

An amount of polyvalent carboxylic acid used is preferably 0.2 mol to 5.0 mol and more preferably 0.5 mol to 2.5 mol with respect to 1 mol of trivalent Fe ions.

After adding polyvalent carboxylic acid, the stirring is preferably performed. The stirring time may be, for example, 10 minutes to 2 hours. After the stirring, the solid component is precipitated. The precipitated solid component is extracted.

An extracting method of the solid component is not particularly limited, and a method of performing centrifugal separation is preferably used, from a viewpoint of simplicity of the operation, for example.

The extracted solid component may be washed with water or the like and dried before the subsequent step (I-2). The drying temperature is not particularly limited, and may be, for example, 60° C. to 100° C.

In the step (I-2), the solid component extracted in the step (I-1) is re-dispersed in water. Water is preferably pure water and ion exchange water.

In a case of performing the step (II) by performing the steps (I-1) and (I-2) after the step (I), the alkali agent is added after re-dispersing solid components in water.

Step (II)

In the step (II), a precursor particle dispersion liquid is obtained by adding a silane compound including a hydrolyzable group after adding the alkali agent in the step (I).

Examples of the silane compound including a hydrolyzable group include tetraethoxy silane (TEOS: tetraethyl orthosilicate) and tetramethoxy silane, and TEOS is preferable.

An amount of the silane compound including a hydrolyzable group used is preferably an amount so that the amount of Si is 0.5 mol to 30 mol and more preferably an amount so that the amount of Si is 2 mol to 15 mol with respect to 1 mol of Fe.

After adding the silane compound including a hydrolyzable group, the stirring is preferably performed. The stirring time is not particularly limited and may be, for example, 1 hour to 24 hours.

A liquid temperature during the stirring can be 15° C. to 80° C. and may be increased to 30° C. to 80° C.

After adding the silane compound including a hydrolyzable group, an aggregating agent may be added.

As the aggregating agent, di- or higher valent salt is preferable. In addition, it is preferable that the aggregating agent has high solubility to water. Here, the "high solubility to water" indicates that 5% by mass or more of a component is dissolved, in a case of adding the component to water at 25° C.

Specific examples of the aggregating agent include ammonium sulfate and ammonium oxalate.

A liquid temperature during adding the aggregating agent may be, for example, 15° C. to 80° C. The aggregating agent is preferably added while stirring the aqueous solution.

Step (III)

In the step (III), the precursor particles are extracted from the precursor particle dispersion liquid obtained in the step (II).

A method of extracting the precursor particles is not particularly limited, and a method of performing centrifugal separation is preferably used, from a viewpoint of simplicity of the operation. The conditions of the centrifugal separation are not particularly limited, and may be, for example, 1,000 revolutions per minute (rpm; the same applies hereinafter) to 10,000 rpm for 1 minute to 60 minutes.

The extracted precursor particles may be dried. The drying method is not particularly limited, and a method using a drying machine (for example, oven) is used.

The precursor particles are particles in which a Si-containing coating film generated by hydrolysis of TEOS is formed.

Step (IV)

In the step (IV), the precursor particles obtained in the step (III) is subjected to heat treatment in a temperature range of 800° C. to 1,400° C. to obtain heat-treated particles. By performing the heat treatment, magnetic properties are imparted to the precursor particles.

The atmosphere in the heat treatment is not particularly limited, and may be performed under the ordinary pressure or in an environment with the air.

The heat treatment time is not particularly limited and may be, for example, 1 hour to 8 hours.

Step (V)

In the step (V), the heat-treated particles obtained in the step (IV) are added to the alkali aqueous solution and the treatment is performed at a liquid temperature equal to or higher than 75° C. By performing the treatment in the alkali aqueous solution in a temperature range equal to or higher than 75° C., particles of the epsilon type iron oxide-based compound capable of forming a magnetic layer including a surface having the 1-bromonaphthalene contact angle and the water contact angle described above are obtained. In addition, in the step (V), the Si-containing coating film remaining in the heat-treated particle is removed.

In this step, the treatment for obtaining particles of the epsilon type iron oxide-based compound capable of forming a magnetic layer including a surface having the 1-bromonaphthalene contact angle and the water contact angle described above may be performed, and a step of removing the remaining Si-containing coating film may be further provided, separately from this step.

Examples of the alkali aqueous solution include hydroxide of metal selected from alkali metal or alkali earth metal, and halide of metal selected from alkali metal or alkali earth metal. Among these, a strong alkali aqueous solution is preferable, and for example, a sodium hydroxide aqueous solution or potassium hydroxide aqueous solution can be suitably used.

Water which is a solvent of the alkali aqueous solution is preferably pure water or ion exchange water.

A liquid temperature of the alkali aqueous solution is equal to or higher than 75° C. and preferably equal to or higher than 80° C. The liquid temperature of the alkali aqueous solution may be equal to or higher than 85° C. and may be equal to or higher than 90° C. Since the solvent is water, the liquid temperature of the alkali aqueous solution is preferably lower than 100° C.

By setting the liquid temperature of the alkali aqueous solution to be equal to or higher than 75° C., the 1-bromonaphthalene contact angle of the magnetic layer formed using the particles of the obtained epsilon type iron oxide-based compound can be set to be equal to or higher than 30.0°. As the liquid temperature of the alkali aqueous solution increases, the 1-bromonaphthalene contact angle tends to increase.

A concentration of the alkali aqueous solution is preferably equal to or greater than 8 mol/L, more preferably equal to or greater than 10 mol/L, and even more preferably equal to or greater than 12 mol/L. In addition, the upper limit of the concentration of the alkali aqueous solution is preferably equal to or smaller than 16 mol/L and more preferably equal to or smaller than 13 mol/L.

As the concentration of the alkali aqueous solution increases, the 1-bromonaphthalene contact angle tends to increase.

It is preferable that the alkali aqueous solution, to which the heat-treated particles are added, is stirred while maintaining the liquid temperature to be equal to or higher than 75° C. The stirring time can be equal to or longer than 15 hours and may be can be equal to or longer than 20 hours.

As the stirring time increases, the 1-bromonaphthalene contact angle tends to increase.

In order to set the 1-bromonaphthalene contact angle to be equal to or greater than 30.0° and smaller than 45.0° and the water contact angle to be 80.0° to 95.0°, it is preferable to adjust at least one of the liquid temperature, the concentration, or the stirring time of the alkali aqueous solution.

Steps (V-1) and (V-2)

The particles of the epsilon type iron oxide-based compound obtained in the step (V) may be washed and dried.

During the washing, water may be used and an aqueous solution including a water-soluble polymer may be used. In a case of using the aqueous solution including a water-soluble polymer, dispersibility of the particles of the epsilon type iron oxide-based compound in the aqueous solution tends to be improved. In addition, by performing treatment with respect to the surface of the particles of the epsilon type iron oxide-based compound with the water-soluble polymer, undesired fine particles tend to be efficiently removed by the subsequent solid-liquid separation.

Water used in the washing and water which is the solvent of the aqueous solution including the water-soluble polymer are preferably pure water or ion exchange water.

Examples of the water-soluble polymer include polyvinyl alcohol (PVA), hydroxyethyl cellulose (HEC), and polyvinylpyrrolidone (PVP).

As the method of the solid-liquid separation, a method of performing the centrifugal separation is preferable, from a viewpoint of simplicity. The conditions of the centrifugal separation are not particularly limited, and can be, for example, 1,000 rpm to 10,000 rpm for 1 minute to 60 minutes.

The drying method of the washed particles of the epsilon type iron oxide-based compound is not particularly limited, and a method using a drying machine (for example, oven) at an internal atmosphere temperature of 60° C. to 110° C. is used, for example.

Manufacturing Method of Magnetic Recording Medium

The manufacturing method of a magnetic recording medium of this disclosure includes a step of preparing a magnetic layer forming composition using the particles of the epsilon type iron oxide-based compound obtained by the manufacturing method of the particles of the epsilon type iron oxide-based compound of this disclosure (hereinafter, also referred to as a "step A"); a step of applying the magnetic layer forming composition onto a non-magnetic support to form a magnetic layer forming composition layer (hereinafter, also referred to as a "step B"); a step of performing an alignment in magnetic field with respect to the formed magnetic layer forming composition layer (hereinafter, also referred to as a "step C"); and a step of drying the magnetic layer forming composition layer subjected to the alignment in magnetic field to form a magnetic layer (hereinafter, also referred to as a "step D").

The manufacturing method of this disclosure can further include a step of performing a calender process of the non-magnetic support including the magnetic layer (hereinafter, also referred to as a "step E"), and a step of forming any layer such as a non-magnetic layer or a back coating layer (hereinafter, also referred to as a "step F"), if necessary.

Each step may be divided into two or more stages.

Hereinafter, each step of the manufacturing method of this disclosure will be described in detail.

Step A

In the step A, the magnetic layer forming composition is prepared by using the particles of the epsilon type iron oxide-based compound obtained by the manufacturing method of the particles of the epsilon type iron oxide-based compound of this disclosure. The details of the process of obtaining the particles of the epsilon type iron oxide-based compound by the manufacturing method of the particles of the epsilon type iron oxide-based compound of this disclosure are as described above, and therefore, the description is omitted here.

The step A can include a step of mixing the particles of the epsilon type iron oxide-based compound, a binding agent, and if necessary, additives (other additives described above), and a solvent with each other (hereinafter, also referred to as a "step A1"), and a step of dispersing a mixed solution obtained in the step A1 (hereinafter, also referred to as a "step A2").

All of the raw materials such as the particles of the epsilon type iron oxide-based compound, and the binding agent may be mixed with each other in any stage of the step A.

The raw materials may be mixed with each other at the same time or in two or more parts.

For example, after mixing the binding agent with the other raw materials in the step A2, the binding agent can be further added and mixed for viscosity adjustment after the dispersion.

In the dispersion of the raw materials of the magnetic layer forming composition, a well-known dispersion apparatus such as a batch type vertical sand mill or a transverse beads mill can be used, for example.

As the dispersion beads, glass beads, zirconia beads, titania beads, and steel beads can be used, for example. A particle diameter (so-called bead diameter) and a filling percentage of the dispersion beads can be suitably optimized and used.

In the dispersion of the raw materials of the magnetic layer forming composition, a well-known ultrasonic device can also be used, for example.

In addition, at least some raw materials of the magnetic layer forming composition may be kneaded by using an open kneader, for example, before the step A2.

Regarding the raw materials of the magnetic layer forming composition, solutions for the raw materials may be respectively prepared and mixed with each other. In a case of using an abrasive as a raw material, a magnetic liquid including particles of an epsilon type iron oxide-based compound, and an abrasive solution including the abrasive can be respectively prepared, and mixed with each other for dispersion.

Magnetic Layer Forming Composition

The "particles of the epsilon type iron oxide-based compound", the "binding agent", and the "other additives" for preparing the magnetic layer forming composition are the same as "particles of the epsilon type iron oxide-based compound", the "binding agent", and the "other additives" described in the section of the "magnetic layer" and the preferable aspects are also the same as the preferable aspects thereof. Therefore, the description is omitted here.

A content of the particles of the epsilon type iron oxide-based compound in the magnetic layer forming composition is preferably 5% by mass to 30% by mass and more preferably 8% by mass to 20% by mass with respect to a total mass of the magnetic layer forming composition.

A content of the binding agent in the magnetic layer forming composition is for example, preferably 1 part by mass to 30 parts by mass and more preferably 2 parts by mass to 20 parts by mass with respect to 100 parts by mass of the particles of the epsilon type iron oxide-based compound.

Curing Agent

The magnetic layer forming composition can include a curing agent.

The curing agent contributes to the improvement of film hardness. Depending on the curing agent, by forming a crosslinked structure between the curing agent and the binding agent described above for forming the magnetic layer, film hardness of the magnetic layer can be improved.

As the curing agent, an isocyanate-based compound is preferable.

Examples of the isocyanate-based compound include tolylene diisocyanate, 4,4'-diphenylmethane diisocyanate, hexamethylene diisocyanate, xylylene diisocyanate, naphthylene-1,5-diisocyanate, o-toluidine diisocyanate, isophorone diisocyanate, and triphenylmethane triisocyanate.

In addition, as the isocyanate-based compound, polyisocyanate such as a reaction product of the isocyanate-based compound described above and polyalcohol, and a condensation product of the isocyanate-based compound described above can also be used.

As the curing agent, a commercially available product can be used.

Examples of the commercially available product of the isocyanate-based compound which is a curing agent include CORONATE (registered trademark) L, CORONATE (registered trademark) HL, CORONATE (registered trademark) 2030, CORONATE (registered trademark) 2031, CORONATE (registered trademark) 3041, MILLIONATE (registered trademark) MR, and MILLIONATE (registered trademark) MTL manufactured by Tosoh Corporation, TAKENATE (registered trademark) D-102, TAKENATE (registered trademark) D-110N, TAKENATE (registered trademark) D-200, and TAKENATE (registered trademark) D-202 manufactured by Mitsui Chemicals, Inc., DESMODUR (registered trademark) L, DESMODUR (registered trademark) IL, DESMODUR (registered trademark) N, and DESMODUR (registered trademark) HL manufactured by Covestro Japan Ltd. (all of the above examples are product names).

In a case where the magnetic layer forming composition includes the curing agent, one kind or two or more kinds of the curing agent may be included.

In a case where the magnetic layer forming composition includes the curing agent, a content of the curing agent in the magnetic layer forming composition can be, for example, greater than 0 parts by mass and equal to or smaller than 80 parts by mass with respect to 100 parts by mass of the binding agent, and is preferably 50 parts by mass to 80 parts by mass, from a viewpoint of improving hardness of each layer such as the magnetic layer.

Solvent

The solvent can be used as a dispersion medium of the particles of the epsilon type iron oxide-based compound, the binding agent, and, the additives (other additives and curing agent) which are used if necessary.

One kind of the solvent may be used or a mixed solvent of two or more kinds may be used.

As the solvent, an organic solvent is preferable.

As the organic solvent, a ketone-based compound such as acetone, methyl ethyl ketone, methyl isobutyl ketone, diisobutyl ketone, cyclohexanone, isophorone, or tetrahydrofuran, an alcohol-based compound such as methanol, ethanol, propanol, butanol, isobutyl alcohol, isopropyl alcohol, or methylcyclohexanol, an ester-based compound such as methyl acetate, butyl acetate, isobutyl acetate, isopropyl acetate, ethyl lactate, or glycol acetate, a glycol ether-based compound such as glycol dimethyl ether, glycol monoethyl ether, or dioxane, an aromatic hydrocarbon-based compound such as benzene, toluene, xylene, cresol, or chlorobenzene, a chlorinated hydrocarbon-based compound such as methylene chloride, ethylene chloride, carbon tetrachloride, chloroform, ethylene chlorohydrin, or dichlorobenzene, N,N-dimethylformamide, hexane, and the like can be used, for example.

Among these, as the organic solvent, methyl ethyl ketone, cyclohexanone, and a mixed solvent including these at any ratio are preferable.

For example, from a viewpoint of improving dispersibility, a solvent having strong polarity to some extent is preferable as a solvent, and it is preferable that a content of a solvent having dielectric constant equal to or greater than 15 in the magnetic layer forming composition is equal to or greater than 50% by mass with respect to a total mass of the solvent. In addition, a dissolution parameter of the solvent is preferably 8 to 11.

Step B

The manufacturing method of this disclosure includes a step of applying the magnetic layer forming composition onto the non-magnetic support to form a magnetic layer forming composition layer (that is, the step B), after the step A.

The step B can be performed, for example, by applying the magnetic layer forming composition onto the running non-magnetic support so as to obtain a predetermined film thickness.

The preferred thickness of the magnetic layer is as described in the section of the "magnetic layer".

As a coating method of applying the magnetic layer forming composition, a well-known method such as air doctor coating, blade coating, rod coating, extrusion coating, air knife coating, squeeze coating, impregnation coating, reverse roll coating, transfer roll coating, gravure coating, kiss coating, cast coating, spray coating, and spin coating can be used.

Regarding the coating method, "Latest coating technologies" published by Sogo Gijutsu Center (31 May 1983) can be referred to, for example.

Step C

The manufacturing method of this disclosure includes a step of performing an alignment in magnetic field with respect to the formed magnetic layer forming composition layer (that is, step C), after the step B.

In a case where the non-magnetic support has a film shape such as a magnetic tape, the alignment in magnetic field of the formed magnetic layer forming composition layer can be performed with respect to the particles of the epsilon type iron oxide-based compound included in the magnetic layer forming composition by using cobalt magnets or solenoid.

In a case where the non-magnetic support is a hard disk, isotropic alignment of the formed magnetic layer forming composition layer is obtained without performing an alignment without using an alignment device, and the alignment in magnetic field may be performed by a method of obliquely alternately disposing cobalt magnets or applying an alternating magnetic field by solenoid using a well-known random alignment device.

In addition, isotropic magnetic properties can also be applied in a circumferential direction by performing homeotropic alignment by using a well-known method such as a method using a polar opposing magnet. Particularly, in a case of performing high-density recording, homeotropic alignment is preferable. In addition, circumferential alignment can also be performed by using a spin coating.

The alignment in magnetic field is preferably performed before drying the formed magnetic layer forming composition layer.

The alignment in magnetic field can be performed by a homeotropic alignment process of applying a magnetic field having magnetic field strength of 0.1 T to 1.0 T in a vertical direction to the surface of the applied magnetic layer forming composition.

Step D

The manufacturing method of this disclosure includes a step of drying the magnetic layer forming composition layer subjected to the alignment in magnetic field to form a magnetic layer (that is, step D), after the step C.

The drying of the magnetic layer forming composition layer can be controlled according to a temperature of dry air, an air flow, or an application speed.

For example, the application speed is preferably 20 m/min to 1,000 m/min, and a temperature of the dry air is preferably equal to or higher than 60° C. In addition, the magnetic layer forming composition layer can be suitably preliminarily dried before applying a magnetic field.

Step E

The manufacturing method of this disclosure preferably includes a step of performing a calender process with respect to the non-magnetic support including the magnetic layer (that is, step E), after performing the step A, the step B, the step C, and the step D.

The non-magnetic support including the magnetic layer is temporarily wound with a winding roll, unwound from the winding roll, and supplied for the calender process.

According to the calender process, surface smoothness is improved, and a filling percentage of the particles of the epsilon type iron oxide-based compound in the magnetic layer is improved due to disappearance of holes generated due to removal of the solvent at the time of drying. Accordingly, it is possible to obtain a magnetic recording medium having high electromagnetic conversion characteristics (for example, SNR).

The step E is preferably performed while changing calender process conditions according to smoothness of the surface of the magnetic layer.

In the calender process, a super calender roll or the like can be used, for example.

As a calender roll, a heat resistant plastic roll formed of resins such as an epoxy-based resin, a polyimide-based resin, a polyamide-based resin, or a polyamideimide-based resin can be used. In addition, the process can also be performed by using a metal roll.

As the calender process conditions, a temperature of the calender roll can be, for example, 60° C. to 120° C. and can be preferably set as 80° C. to 100° C., and pressure can be, for example, 100 kg/cm to 500 kg/cm (98 kN/m to 490 kN/m) and can be preferably set as 200 kg/cm to 450 kg/cm (196 kN/m to 441 kN/m).

Step F

The manufacturing method of this disclosure can include a step of forming any layer such as a non-magnetic layer and a back coating layer (that is, step F), if necessary.

The non-magnetic layer and the back coating layer can be respectively formed through the same step as the step B and the step D of the magnetic layer, after preparing compositions for forming the respective layers.

As described in the sections of the "non-magnetic layer" and the "back coating layer", the non-magnetic layer can be provided between the non-magnetic support and the magnetic layer, and the back coating layer can be provided on a surface of the non-magnetic support on a side opposite to the magnetic layer side.

A forming composition for the non-magnetic layer and a forming composition for the back coating layer can be prepared by further including a solvent to the component and the amount described in the sections of the "non-magnetic layer" and the "back coating layer".

Recording System of Magnetic Recording Medium

As a recording system of the magnetic recording medium of this disclosure, a helical scan recording system or a linear recording system may be used, and a linear recording system is preferable.

The magnetic recording medium of this disclosure has an excellent SNR, and thus, the magnetic recording medium is suitable for recording in a linear system.

In a case of using a linear recording system as the recording system of the magnetic recording medium of this disclosure, the particles of the epsilon type iron oxide-based compound included in the magnetic layer is more preferably the compound represented by Formula (1), from a viewpoint of ease of recording, for example.

The magnetic recording medium of this disclosure is preferably used in electromagnetic wave assist recording.

In the magnetic recording medium of this disclosure, the particles of the epsilon type iron oxide-based compound are used as a magnetic material. The reversing of a spin of the particles of the epsilon type iron oxide-based compound is difficult due to extremely high coercivity. In the magnetic recording medium of this disclosure, the spin is easily reversed only in a case of performing the recording by using so-called electromagnetic wave assist recording of irradiating the particles of the epsilon type iron oxide-based compound included in the magnetic layer with electromagnetic waves and reversing and recording the spin by a magnetic field while causing precession, and thus, excellent recording can be realized.

EXAMPLES

Hereinafter, the magnetic recording medium, the manufacturing method of the particles of the epsilon type iron oxide-based compound, and the manufacturing method of the magnetic recording medium of this disclosure will be further described with reference to examples. However, the magnetic recording medium and the like of this disclosure are not limited to the following examples, as long as the descriptions are not departed from the gist thereof.

Examples 1 to 9 and Comparative Example 1 to 5

Preparation of Epsilon Type Iron Oxide-Based Compound
Preparation of Magnetic Material 1
Step (I)
33.2 g of iron (III) nitrate nonahydrate, 5.3 g of gallium (III) nitrate octahydrate, 762 mg of cobalt (II) nitrate hexahydrate, 599 mg of titanium (IV) sulfate, and 5.2 g of polyvinylpyrrolidone (PVP) were added to 360 g of pure water and stirred by using a magnetic stirrer, to obtain an aqueous solution 1 including a compound including trivalent ferrous ions.

4.0 g of citric acid was dissolved in 35 g of pure water to prepare a citric acid aqueous solution.

The prepared aqueous solution 1 was stirred with a magnetic stirrer under the conditions of the atmosphere and a temperature of 25° C., and 4.0 g of a 25% by mass ammonia aqueous solution (alkali agent) was added thereto, and stirred for 2 hours while maintaining the liquid temperature at a temperature of 25° C.

After the stirring, the prepared citric acid aqueous solution was added and stirred for 1 hour, and the generated precipitate was extracted by the centrifugal separation [step (I-1)].

The extracted precipitate was washed with pure water and dried at 80° C. to obtain a dried material. The dried material was dispersed again in water by adding 30,000 g of pure water thereto, and a dispersion liquid was obtained [step (I-2)].

Step (II)
The obtained dispersion liquid was heated to 50° C., 1,500 g of a 25% by mass ammonia aqueous solution was added dropwise while stirring. The mixture was stirred for 1 hour while maintaining the temperature at 50° C. 56 mL of tetraethoxysilane (TEOS) was added dropwise and stirred for 24 hours. Then, 100 g of ammonium sulfate was added to obtain a dispersion liquid including a precipitate.

Step (III)
The generated precipitate was extracted by the centrifugal separation. The extracted precipitate was washed with pure water and dried at 80° C. for 24 hours, and precursor particles were obtained.

Step (IV)
A furnace was filled with the obtained precursor particles and heat treatment was performed under atmosphere at 1,030° C. for 4 hours, thereby obtaining heat-treated particles.

Step (V)
The heat-treated particles were put into a 8 mol/L sodium hydroxide (NaOH) aqueous solution and stirred at a liquid temperature of 80° C. for 24 hours, thereby removing a Si-containing coating film.

After that, the solid-liquid separation was performed by the centrifugal separation, and the obtained solid material was washed with pure water and dried, thereby obtaining particles of a magnetic material 1.

Preparation of Magnetic Materials 2 to 5 and 8 to 10
Particles of magnetic materials 2 to 5 and 8 to 10 were prepared by the same method as in the preparation of the magnetic material 1, except that, the concentration, the liquid temperature, and the stirring time of the sodium hydroxide (NaOH) aqueous solution of the step (V) in the preparation of the magnetic material 1 were changed to the conditions shown in Table 1.

In the preparation of the magnetic material 4, the heat treatment temperature in the furnace was set as 1,010° C., and in the preparation of the magnetic material 5, the heat treatment temperature in the furnace was set as 1,045° C.

Preparation of Magnetic Material 6
33.2 g of iron (III) nitrate nonahydrate, 4.9 g of aluminum (III) nitrate nonahydrate, 762 mg of cobalt (II) nitrate hexahydrate, 599 mg of titanium (IV) sulfate, and 5.2 g of polyvinylpyrrolidone (PVP) were added to 360 g of pure water and stirred by using a magnetic stirrer, to obtain an aqueous solution 2 including a compound including trivalent ferrous ions.

Particles of the magnetic material 6 were prepared by the same method as in the preparation of the magnetic material 1, except that the aqueous solution 1 in the preparation of the magnetic material 1 was replaced with the aqueous solution 2.

Preparation of Magnetic Material 7
40.7 g of iron (III) nitrate nonahydrate and 5.2 g of polyvinylpyrrolidone (PVP) were added to 360 g of pure water and stirred by using a magnetic stirrer, to obtain an aqueous solution 3 including a compound including trivalent ferrous ions.

Particles of the magnetic material 7 were prepared by the same method as in the preparation of the magnetic material 1, except that the aqueous solution 1 in the preparation of the magnetic material 1 was replaced with the aqueous solution 3.

Measurement and Structure Specification
1. Crystal Structure of Magnetic Materials 1 to 10
The crystal structures of the magnetic materials 1 to 10 were confirmed by the X-ray diffraction (XRD) method. As a device, the measurement was performed under the following conditions using a diffractometer, X'Pert Pro manufactured by PANalytical.

Measurement Conditions
X-ray source: Cu Kα ray (wavelength of 1.54 Å (0.154 nm)), (output: 40 mA, 45 kV)
Scanned range: 20°<2θ<70°
Scan interval: 0.05°
Scan speed: 0.75°/min As a result of the measurement, it was confirmed that all of the magnetic materials 1 to 10 were single phase having an epsilon type crystal structure. Accordingly, it was confirmed that the magnetic materials 1 to 10 do not have α type, β type, and γ type crystal structures.

2. Composition of Magnetic Materials 1 to 10

The compositions of the magnetic materials 1 to 10 were confirmed by a high-frequency inductively coupled plasma (ICP-OES) emission spectral analysis method. As a device, product name: ICPS-8100 manufactured by Shimadzu Corporation was used.

Specifically, a vessel containing 12 mg of the magnetic material 1 and 10 ml of hydrochloric acid aqueous solution having a concentration of 4 mol/L was held on a hot plate at a set temperature of 80° C. for 3 hours, and a solution was obtained. After adding 30 mL of pure water to the obtained solution, the mixture was filtered by using a membrane filter having a hole diameter of 0.1 µm. The obtained filtrate was subjected to element analysis by using the device. A content of each metal atom with respect to 100 atom % of iron atoms was obtained based on the obtained result of the element analysis.

As a result, the composition of each magnetic material was as described below.

Magnetic materials 1 to 5 and 8 to 10: $\epsilon\text{-}Ga_{0.27}Co_{0.05}Ti_{0.05}Fe_{1.63}O_3$

[Compound represented by Formula (6)]

Magnetic material 6: $\epsilon\text{-}Al_{0.24}Co_{0.05}Ti_{0.05}Fe_{1.66}O_3$

[Compound represented by Formula (6)]

Magnetic material 7: $\epsilon\text{-}Fe_2O_3$

[Compound represented by Formula (1) (a=0)]

3. Shape of Particles of Magnetic Materials 1 to 10

The shape of the particles of the magnetic materials 1 to 10 was confirmed by observation with a transmission electron microscope (TEM) and all of the particles of the magnetic materials had a sphere shape.

4. Average Equivalent Circle Diameter of Particles of Magnetic Materials 1 to 10

The average equivalent circle diameters of the particles of the magnetic materials 1 to 10 were obtained by the following method.

The particles were imaged with a transmission electron microscope (TEM) (model number: H-9000, manufactured by Hitachi, Ltd.) at an imaging magnification ratio of 80,000 and printed on photographic printing paper so that the total magnification ratio becomes 500,000. The primary particle was selected from the printed particles and an outline of the primary particle was traced with a digitizer. A diameter (equivalent circle area diameter) of a circle having the same area as the traced region was obtained by using image analysis software KS-400 manufactured by Carl Zeiss as the image analysis software.

The equivalent circle area diameters of 500 particles which were randomly extracted from the primary particles printed on the plurality of photographic printing paper were calculated. By performing simple averaging (that is, number averaging) of the obtained equivalent circle area diameters of 500 particles, an average equivalent circle diameter of the particles was obtained. The result is shown in Table 1.

Manufacturing of Magnetic Recording Medium (Magnetic Tape)

(1) Preparation of Magnetic Layer Forming Composition

The magnetic layer forming composition having the composition shown below was prepared by the following method.

First, each component of the magnetic liquid having the composition shown below was beads-dispersed by using a batch type vertical sand mill for 24 hours. In this beads dispersion, zirconia beads having a diameter of 0.5 mm and density of 6.0 g/cm³ were used. The amount of zirconia beads which was 10 times that of the particles of the magnetic material based on mass was used. After that, a dispersion liquid A was obtained by performing the filtering using a filter having an average hole diameter of 0.5 µm.

The obtained dispersion liquid A was beads-dispersed with a batch type vertical sand mill for 1 hour. In this beads dispersion, diamond beads having a diameter of 500 nm and density of 3.5 g/cm³ were used. After that, the diamond beads were separated with a centrifugal separation device, and then a dispersion liquid B was prepared and used as a magnetic liquid.

Then, the abrasive solution having the composition shown below was prepared by the following method.

First, each component of the abrasive solution having the composition shown below was beads-dispersed by using a transverse beads mill dispersion device for 120 minutes. In this beads dispersion, zirconia beads having a diameter of 0.3 mm were used. Regarding the zirconia beads, the amount thereof so that the bead volume/(volume of abrasive solution+bead volume) becomes 80% was used. After the beads mill dispersion, the liquid was extracted from the transverse beads mill dispersion device, and ultrasonic dispersion and filtering were performed with a flow type ultrasonic dispersion filtering device, thereby preparing the abrasive solution.

The magnetic liquid and the abrasive solution prepared as described above, and other components shown below (non-magnetic filler solution, lubricant and curing agent solution) were mixed with each other, and stirred for 30 minutes with a dissolver stirrer a circumferential speed of 10 m/sec.

Then, the dispersion process was performed with a flow type ultrasonic device at a flow rate of 7.5 kg/min three times, and filtering was performed with a filter having an average hole diameter of 0.1 µm, to preparing a magnetic layer forming composition.

Composition of Magnetic Layer Forming Composition

Magnetic Liquid

Magnetic material shown in Table 1: 100.0 parts by mass (Magnetic materials 1 to 10 prepared as described above)

Oleic acid: 2.0 parts by mass

A vinyl chloride copolymer (manufactured by Zeon Corporation, MR-104): 10.0 parts by mass SO₃Na group-containing polyurethane resin: 4.0 parts by mass (Weight-average molecular weight: 70,000, SO₃Na group: 0.07 meq/g)

Methyl ethyl ketone: 150.0 parts by mass

Cyclohexanone: 150.0 parts by mass

Abrasive Solution

α-alumina: 6.0 parts by mass (BET specific surface area: 19 m²/g, Mohs hardness: 9)

SO₃Na group-containing polyurethane resin: 0.6 parts by mass (Weight-average molecular weight: 70,000, SO₃Na group: 0.1 meq/g)

2,3-dihydroxynaphthalene: 0.6 parts by mass

Cyclohexanone: 23.0 parts by mass

Non-Magnetic Filler Solution

Colloidal silica: 2.0 parts by mass (Average particle diameter: 120 nm)

Methyl ethyl ketone: 8.0 parts by mass

Lubricant

Stearic acid: amount shown in Table 1

Stearic acid amide: amount shown in Table 1

Butyl stearate: amount shown in Table 1

Curing Agent Solution
Methyl ethyl ketone: 110.0 parts by mass
Cyclohexanone: 110.0 parts by mass
Polyisocyanate: 3.0 parts by mass
(CORONATE (registered trademark) L manufactured by Tosoh Corporation)

(2) Preparation of Non-Magnetic Layer Forming Composition

The non-magnetic layer forming composition having the composition shown below was prepared by the following method.

First, each component of the non-magnetic layer forming composition having the composition shown below was beads-dispersed by using a batch type vertical sand mill for 24 hours. In this beads dispersion, zirconia beads having a diameter of 0.1 mm were used. Then, by filtering using a filter having an average hole diameter of 0.5 μm, a non-magnetic layer forming composition was prepared.

Composition of Non-Magnetic Layer Forming Composition
Non-magnetic inorganic particles; α-iron oxide: 100.0 parts by mass
  (Average particle diameter (average long axis length): 10 nm, BET specific surface area: 75 m$^2$/g)
Carbon black: 25.0 parts by mass
  (Average particle diameter: 20 nm)
SO$_3$Na group-containing polyurethane resin: 18.0 parts by mass
  (Weight-average molecular weight: 70,000, content of SO$_3$Na group: 0.2 meq/g)
Stearic acid: 1.0 part by mass
Cyclohexanone: 300.0 parts by mass
Methyl ethyl ketone: 300.0 parts by mass (3) Preparation of Back Coating Layer Forming Composition The back coating layer forming composition having the composition shown below was prepared by the following method.

First, among the components of the back coating layer forming composition having the composition shown below, the components excluding stearic acid and butyl stearate which are a lubricant, polyisocyanate which is a curing agent, and cyclohexanone were kneaded by an open kneader and diluted. In the dilution, a mixed solvent of methyl ethyl ketone and cyclohexanone was used.

After that, a dispersion process of 12 passes was performed by setting a retention time for 1 pass as 2 minutes with a transverse beads mill dispersion device and zirconia beads having a diameter of 1 mm, under the conditions of a bead filling percentage of 80 volume %, a circumferential speed of rotor distal end of 10 m/sec, and a first dispersion liquid was obtained.

Next, the remaining components (that is, butyl stearate and stearic acid which are a lubricant, polyisocyanate which is a curing agent, and cyclohexanone) were added into the obtained first dispersion liquid and stirred with a dissolver stirrer, to obtain a second dispersion liquid.

Then, the obtained second dispersion liquid was filtered with a filter having an average hole diameter of 1.0 μm and a back coating layer forming composition was obtained.

Composition of back Coating Layer Forming Composition
Non-magnetic inorganic particles; α-iron oxide: 80.0 parts by mass
  (Average particle diameter (average long axis length): 0.15 μm, BET specific surface area: 52 m$^2$/g)
Carbon black: 20.0 parts by mass
  (Average particle diameter: 20 nm)
A vinyl chloride copolymer: 13.0 parts by mass
A sulfonic acid salt group-containing polyurethane resin: 6.0 parts by mass
Phenylphosphonic acid: 3.0 parts by mass
Cyclohexanone (dilution solvent): 155.0 parts by mass
Methyl ethyl ketone (dilution solvent): 155.0 parts by mass
Stearic acid: 3.0 parts by mass
Butyl stearate: 3.0 parts by mass
Polyisocyanate: 5.0 parts by mass
Cyclohexanone: 200.0 parts by mass (4) Manufacturing of Magnetic Tape The non-magnetic layer forming composition was applied onto a polyethylene naphthalate support (that is, non-magnetic support) having a thickness of 5.0 μm so that the thickness after drying becomes 100 nm, and dried, to form a non-magnetic layer.

Then, the magnetic layer forming composition was applied onto the formed non-magnetic layer so that the thickness after drying becomes 70 nm to form a coating layer. While the formed coating layer is wet, a homeotropic alignment process was performed by applying a magnetic field having magnetic field strength of 0.15 T in a vertical direction to the surface of the coating layer, the coating layer was dried, and a magnetic layer was formed.

Then, the back coating layer forming composition was applied onto the surface of the non-magnetic support on a side opposite to the surface where the non-magnetic layer and the magnetic layer are formed so that the thickness after drying becomes 0.4 μm, and dried to form a back coating layer, and a laminate having a layer configuration of back coating layer/non-magnetic support/non-magnetic layer/magnetic layer was obtained.

Next, the surface smoothing treatment (so-called calender process) was performed with respect to the obtained laminate with a pair of calender rolls configured of only the metal roll, at a calender process speed of 100 m/min, linear pressure of 300 kg/cm (294 kN/m), and a surface temperature of a calender roll of 100° C., and heat treatment was performed in an environment of an atmosphere temperature of 70° C. for 36 hours. After the heat treatment, the laminate was slit to have a width of ½ inches (0.0127 meters), and a magnetic tape was manufactured.

Then, the manufactured magnetic tape was subjected to surface treatment with diamond wheel disclosed in JP1993-062174A (JP-H05-062174A) (treatment performed with the aspect shown in FIGS. 1 to 3 of JP1993-062174A (JP-H05-062174A)). The magnetic tape after the surface treatment was wound around a reel in a roll shape.

(5) Measurement and Evaluation

The following measurements and evaluations were performed with respect to the magnetic tapes of Examples 1 to 10 and Comparative Examples 1 to 5 manufactured as described above. The evaluation result is shown in Table 1.

(1) Measurement of Contact Angle

The measurement of the contact angle was performed by the following method with a contact angle measurement device (manufactured by Kyowa Interface Science Co., Ltd., contact angle measurement device Drop Master 700).

A sample for measurement was manufactured by cutting the magnetic tape wound in a roll shape to have a certain length from an edge of the roll. The sample for measurement was placed on slide glass. In this case, the sample for measurement was disposed so that the back coating layer side of the sample for measurement is in contact with the slide glass. By disposing as described above, the surface of the measurement sample becomes a surface of a magnetic layer.

2.0 μl of a liquid for measurement (1-bromonaphthalene or water) was added dropwise to the surface of the measurement sample. The formation of stable liquid droplets from the dropwise-added liquid was visually confirmed, a liquid droplet image was analyzed by contact angle analysis software FAMAS attached to the contact angle measurement device, and a contact angle formed by the surface of the magnetic layer and the liquid droplet was measured. The calculation of the contact angle was performed by a θ/2 method, the measurement was performed regarding 1 sample six times, an average value thereof was set as a contact angle. The measurement was performed in the environment of a temperature of 20° C. and relative humidity of 25% RH, and the contact angle was obtained under the following analysis conditions.

Method: liquid droplet method (θ/2 method)

Droplet landing confirmation: automatic

Droplet landing confirmation line (distance from needle tip): 50 dot

Algorithm: automatic

Image mode: frame

Threshold level: automatic (2) Evaluation of Contamination of Magnetic Head

Head Surface Contamination

The magnetic tape wound around in a roll shape was left in an environment of a temperature of 40° C. and relative humidity of 80% RH for 5 days, and an acceleration test corresponding to long-period storage was performed, thereby obtaining a magnetic tape. The magnetic tape after the acceleration test was cut out to have a length of 20 m.

In the environment of a temperature of 30° C. and relative humidity of 50% RH, the magnetic head detached from a LTO (registered trademark) G5 (linear tape-open generation 5) drive manufactured by IBM was attached to a tape running device. In this tape running device, the magnetic tape after the acceleration test cut out to have a length of 20 m was set, 10,000 cycles of the running were performed by setting an operation from the sending with a sending roll to the winding with a winding roll at 8.0 m/sec while applying a tension of 0.8 N, as 1 cycle.

The entire surface of the head after the running was observed with a microscope at a magnification ratio of 100, an image process was performed with image process software (Win Roof (manufactured by Mitani Corporation)), and an area where the attached material was attached, was obtained.

A ratio of the area of the portion, where the attached material is attached, to the area of the head surface [(area of the portion, where the attached material is attached)/(area of head surface)×100] was obtained, and the evaluation was performed with the following standard, by setting this ratio as an index for the contamination of the head surface.

A case where the evaluation result is A or B is determined as that there is no contamination on the head surface during the repeated running after the long-term storage.

Evaluation Standard

A: 0 area %

B: greater than 0 area % and smaller than 5 area %

C: equal to or greater than 5 area % and smaller than 10 area %

D: equal to or greater than 10 area % and smaller than 30 area %

E: equal to or greater than 30 area %

Contamination of Head Edge

The entire head after the running was observed and the image process was performed with image process software by the same method as in the evaluation of the contamination of the head surface. In this case, an area of the head edge, where the attached material was attached, was obtained.

A ratio of the area of the portion of the head edge, where the attached material is attached, to the area of the head edge [(area of the portion of the head edge, where the attached material is attached)/(area of head edge)×100] was obtained, and the evaluation was performed with the following standard, by setting this ratio as an index for the contamination of the head edge.

Evaluation Standard

4: No attached material was observed on the head edge.

3: attached material was observed in a portion having an area equal to or smaller than 50 area % of the head edge.

2: attached material was observed in a portion having an area greater than 50 area % and equal to or smaller than 70 area % of the head edge.

1: attached material was observed in a portion having an area greater than 70 area % of the head edge.

Signal to Noise Ratio (SNR)

The electromagnetic conversion characteristics (SNR) were measured by performing the recording and reproducing before and after the following running, using a reel tester having a width of ½ inches (0.0127 meters) to which a head was fixed, by the following method.

(1) The running of the magnetic tape was reciprocated for 5,000 passes with 1,000 m per 1 pass, with the reel tester by setting a transportation speed (head/tape relative speed) as 12.0 m/sec.

(2) Before and after the running, the electromagnetic conversion characteristics were respectively measured by the method shown below.

Regarding the obtained SNR, a difference between the SNR before the running and the SNR after the running (after reciprocation of 5,000 passes) "(SNR before the running)−(SNR after the running)" was repeatedly calculated, and a decreased amount of an SNR due to high-speed transportation (transportation speed of 12.0 m/sec) was evaluated. SNR decrease (dB) in this case is shown in Table 1.

(3) The measurement of the electromagnetic conversion characteristics (SNR) was performed by the following method.

Recording

The recording was performed by setting a transportation speed (head/tape relative speed) as 5.5 m/sec by using a metal-in-gap (MIG) head (gap length of 0.15 μm, track width of 1.0 μm). The recording current was set as an optimal recording current of each tape.

Reproducing

The reproducing was performed using a giant-magnetoresistive (GMR) head having an element thickness of 15 nm, a Distance between shields of 0.1 μm, and a lead width of 0.5 μm, as the reproducing head.

A signal having a linear recording density of 270 KFci (flux change per inch) was recorded, a reproduction signal was analyzed with a spectrum analyzer manufactured by Shibasoku Co., Ltd., and a ratio of output of a carrier signal and noise accumulated in a range of the spectrum was set as an SNR.

As the signal, a sufficiently stabilized signal was used after starting the running of the magnetic tape.

In a case where the SNR decrease is equal to or smaller than 2.0 dB, it was determined that a decrease in electromagnetic conversion characteristics was slight and excellent electromagnetic conversion characteristics were exhibited, even in a case where the high-speed transportation was repeated.

On the other hand, in the magnetic tapes of Comparative Examples 1 to 3 in which at least one of the conditions that the 1-bromonaphthalene contact angle was equal to or greater than 30.0° and the water contact angle was equal to or greater than 80.0°, was not satisfied, the contamination on the head surface was significantly generated and the SNR was greatly decreased, compared to those of the magnetic tapes of the examples.

TABLE 1

|  |  | Example 1 | Example 2 | Example 3 | Example 4 | Example 5 | Example 6 | Example 7 | Example 8 |
|---|---|---|---|---|---|---|---|---|---|
| Magnetic material No. | | 1 | 1 | 2 | 2 | 3 | 4 | 5 | 6 |
| Composition of magnetic material (*1) | Fe | 1.63 | 1.63 | 1.63 | 1.63 | 1.63 | 1.63 | 1.63 | 1.67 |
| | Ga | 0.27 | 0.27 | 0.27 | 0.27 | 0.27 | 0.27 | 0.27 | 0 |
| | Al | 0 | 0 | 0 | 0 | 0 | 0 | 0 | 0.24 |
| | Co | 0.05 | 0.05 | 0.05 | 0.05 | 0.05 | 0.05 | 0.05 | 0.05 |
| | Ti | 0.05 | 0.05 | 0.05 | 0.05 | 0.05 | 0.05 | 0.05 | 0.05 |
| Average equivalent circle diameter of particles of magnetic material (nm) | | 13.6 | 13.6 | 13.6 | 13.6 | 13.6 | 11.2 | 15.9 | 13.4 |
| Conditions of step (V) | NaOH concentration (mol/L) | 8 | 8 | 12 | 12 | 12 | 12 | 12 | 12 |
| | Liquid temperature (° C.) | 80 | 80 | 90 | 90 | 90 | 90 | 90 | 90 |
| | Time (hr) | 24 | 24 | 24 | 24 | 72 | 24 | 24 | 24 |
| Lubricant of magnetic layer | Stearic acid (parts by mass) | 3.4 | 3.7 | 3.7 | 4.0 | 4.0 | 3.7 | 3.7 | 3.7 |
| | Stearic acid amide (parts by mass) | 0.3 | 0.3 | 0.3 | 0.3 | 0.3 | 0.3 | 0.3 | 0.3 |
| | Butyl stearate (parts by mass) | 6.0 | 6.0 | 6.0 | 6.0 | 6.0 | 6.0 | 6.0 | 6.0 |
| Contact angle | 1-Bromonaphthalene | 32.9 | 33.2 | 38.1 | 38.0 | 42.7 | 37.1 | 38.3 | 38.1 |
| | Water | 83.5 | 87.8 | 88.2 | 92.4 | 92.3 | 86.8 | 88.1 | 87.4 |
| Head contamination | Head surface | B | B | A | A | A | A | A | A |
| | Head edge | 4 | 4 | 4 | 3 | 3 | 4 | 4 | 4 |
| SNR decrease (dB) | | 1.4 | 1.1 | 0.5 | 0.9 | 1.3 | 1.0 | 0.6 | 0.8 |

|  |  | Example 9 | Comparative Example 1 | Comparative Example 2 | Comparative Example 3 | Comparative Example 4 | Comparative Example 5 |
|---|---|---|---|---|---|---|---|
| Magnetic material No. | | 7 | 8 | 9 | 8 | 9 | 10 |
| Composition of magnetic material (*1) | Fe | 2 | 1.63 | 1.63 | 1.63 | 1.63 | 1.63 |
| | Ga | 0 | 0.27 | 0.27 | 0.27 | 0.27 | 0.27 |
| | Al | 0 | 0 | 0 | 0 | 0 | 0 |
| | Co | 0 | 0.05 | 0.05 | 0.05 | 0.05 | 0.05 |
| | Ti | 0 | 0.05 | 0.05 | 0.05 | 0.05 | 0.05 |
| Average equivalent circle diameter of particles of magnetic material (nm) | | 13.5 | 13.6 | 13.6 | 13.6 | 13.6 | 13.6 |
| Conditions of step (V) | NaOH concentration (mol/L) | 12 | 4 | 12 | 4 | 12 | 15 |
| | Liquid temperature (° C.) | 90 | 70 | 90 | 70 | 90 | 90 |
| | Time (hr) | 24 | 24 | 24 | 24 | 24 | 96 |
| Lubricant of magnetic layer | Stearic acid (parts by mass) | 3.7 | 3.0 | 3.0 | 3.7 | 4.3 | 3.7 |
| | Stearic acid amide (parts by mass) | 0.3 | 0.3 | 0.3 | 0.3 | 0.3 | 0.3 |
| | Butyl stearate (parts by mass) | 6.0 | 6.0 | 6.0 | 6.0 | 6.0 | 6.0 |
| Contact angle | 1-Bromonaphthalene | 37.4 | 29.2 | 37.6 | 29.0 | 38.1 | 45.3 |
| | Water | 87.5 | 78.7 | 78.6 | 87.8 | 95.2 | 88.0 |
| Head contamination | Head surface | A | D | C | C | A | A |
| | Head edge | 4 | 4 | 4 | 4 | 1 | 1 |
| SNR decrease (dB) | | — | 2.9 | 2.3 | 2.2 | 2.2 | 2.5 |

(*1): content of each metal atom with respect to 100 atom % of iron atom

As shown in Table 1, in the magnetic tapes of Examples 1 to 9 in which the magnetic layer includes the particles of the epsilon type iron oxide-based compound, the contact angle measured regarding the surface of the magnetic layer is equal to or greater than 30.0° and smaller than 45.0° with respect to 1-bromonaphthalene and 80.0° to 95.0° with respect to water, a decrease in an SNR was prevented.

In addition, in the magnetic tapes of Comparative Examples 4 and 5 in which at least one of the conditions that the 1-bromonaphthalene contact angle was smaller than 45.0° and the water contact angle was equal to or smaller than 95.0°, was not satisfied, the contamination on the head edge was significantly generated and the SNR was greatly decreased, compared to those of the magnetic tapes of the examples.

What is claimed is:

1. A magnetic recording medium comprising:
a non-magnetic support; and
a magnetic layer which is provided on at least one surface of the non-magnetic support and includes particles of at least one kind of epsilon type iron oxide-based compound selected from the group consisting of compounds represented by Formula (1), and a binding agent,
wherein a contact angle measured regarding a surface of the magnetic layer is equal to or greater than 30.0° and equal to or smaller than 42.7° with respect to 1-bromonaphthalene and 80.0° to 95.0° with respect to water, $$\varepsilon\text{-}A_a Fe_{2-a} O_3 \quad (1)$$

in Formula (1), A represents at least one kind of metal element other than Fe, and a represents a number that satisfies a relationship of 0≤a<2.

2. The magnetic recording medium according to claim 1, wherein the magnetic layer includes at least one kind of lubricant selected from the group consisting of fatty acid, fatty acid ester, and fatty acid amide.

3. The magnetic recording medium according to claim 1, wherein an average equivalent circle diameter of the particles of the epsilon iron oxide-based compound is 7 nm to 25 nm.

4. The magnetic recording medium according to claim 1, wherein the compound represented by Formula (1) is a compound represented by Formula (6), $$\varepsilon\text{-}X_x Y_y Z_z Fe_{2-x-y-z} O_3 \quad (6)$$

in Formula (6), X represents at least one kind of divalent metal element selected from the group consisting of Co, Ni, Mn, and Zn, Y represents at least one kind of tetravalent metal element selected from Ti or Sn, Z represents at least one kind of trivalent metal element selected from the group consisting of Ga, Al, In, and Rh, x represents a number that satisfies a relationship of 0<x<1, y represents a number that satisfies a relationship of 0<y<1, z represents a number that satisfies a relationship of 0<z<1, and x+y+z<2.

5. The magnetic recording medium according to claim 4, wherein X is a metal element selected from Co or Mn, Y is Ti, and Z is a metal element selected from Ga or Al.

6. The magnetic recording medium according to claim 1, wherein the contact angle with respect to 1-bromonaphthalene is from 35.0° to 40.0°.

7. The magnetic recording medium according to claim 1, wherein the metal element represented by A in Formula (1) is at least one selected from the group consisting of Ga, Al, In, Rh, Co, Ni, Mn, Zn, Ti, and Sn.

* * * * *